United States Patent
Kokubo et al.

(10) Patent No.: US 12,510,273 B2
(45) Date of Patent: Dec. 30, 2025

(54) TEMPERATURE CONTROL SYSTEM

(71) Applicant: CKD CORPORATION, Aichi (JP)

(72) Inventors: Norio Kokubo, Aichi (JP); Shinichi Nitta, Aichi (JP)

(73) Assignee: CKD Corporation, Aichi (JP)

( * ) Notice: Subject to any disclaimer, the term of this patent is extended or adjusted under 35 U.S.C. 154(b) by 108 days.

(21) Appl. No.: 18/412,701

(22) Filed: Jan. 15, 2024

(65) Prior Publication Data

US 2024/0151444 A1 May 9, 2024

Related U.S. Application Data

(63) Continuation of application No. PCT/JP2022/027371, filed on Jul. 12, 2022.

(30) Foreign Application Priority Data

Aug. 20, 2021 (JP) ................................. 2021-134781

(51) Int. Cl.
*F25B 41/42* (2021.01)
*F25B 41/24* (2021.01)

(52) U.S. Cl.
CPC .............. *F25B 41/42* (2021.01); *F25B 41/24* (2021.01); *F25B 2345/004* (2013.01);
(Continued)

(58) Field of Classification Search
CPC .......... F25B 41/42; F25B 41/40; F25B 41/24; F25B 41/00; F25B 2345/004;
(Continued)

(56) References Cited

U.S. PATENT DOCUMENTS

2004/0182563 A1* 9/2004 Jeong .................... F25B 25/005
165/206
2022/0187027 A1* 6/2022 Ito ............................ F25B 1/00

FOREIGN PATENT DOCUMENTS

JP H11184537 A 7/1999
JP 2002023860 A 1/2002
(Continued)

OTHER PUBLICATIONS

International Search Report issued in corresponding International Application No. PCT/JP2022/027371, dated Sep. 13, 2022, with translation (5 pages).
(Continued)

*Primary Examiner* — Miguel A Diaz
(74) *Attorney, Agent, or Firm* — Osha Bergman Watanabe & Burton LLP

(57) ABSTRACT

A temperature control system includes a first chiller, a first tank, a first tank bypass channel, a first mixing valve that adjusts a mixing ratio of a fluid flowing from the first tank into the first chiller to a fluid flowing from the first tank bypass channel into the first chiller, a second chiller, a second tank, a second tank bypass channel, a second mixing valve that adjusts a mixing ratio of a fluid flowing from the second tank into the second chiller to a fluid flowing from the second tank bypass channel into the second chiller, a first supply valve, a first return valve, a first on-off value, a second supply valve, a second return valve, a second on-off valve, and a controller that controls the valves.

16 Claims, 12 Drawing Sheets

(52) U.S. Cl.
CPC ..... *F25B 2400/161* (2013.01); *F25B 2400/24* (2013.01); *F25B 2600/2507* (2013.01)

(58) Field of Classification Search
CPC ............ F25B 2400/161; F25B 2400/16; F25B 2400/24; F25B 2600/2507; F25B 2600/2515
See application file for complete search history.

(56) References Cited

FOREIGN PATENT DOCUMENTS

| | | | |
|---|---|---|---|
| JP | 2018138843 A | 9/2018 | |
| WO | 2020217800 A1 | 10/2020 | |

OTHER PUBLICATIONS

Written Opinion issued in corresponding International Application No. PCT/JP2022/027371, dated Sep. 13, 2022 (3 pages).
International Preliminary Report on Patentability issued in corresponding International Application No. PCT/JP2022/027371, mailed Feb. 29, 2024, with translation (10 pages).

* cited by examiner

TEMPERATURE CONTROL SYSTEM

CROSS-REFERENCE TO RELATED APPLICATION

The present application is a continuation of International Patent Application No. PCT/JP2022/027371 filed on Jul. 12, 2022, and claims priority to Japanese Patent Application No. 2021-134781 filed on Aug. 20, 2021, both of which are incorporated by reference in their entirely.

BACKGROUND

Technical Field

The present disclosure relates to a temperature control system to control a temperature of a target object.

Description of the Related Art

A known temperature control device includes: a high temperature fluid circulation supply system that circulates and supplies a high temperature fluid; a low temperature fluid circulation supply system that circulates and supplies a low temperature fluid; a supply selection means for selecting a circulation supply system through which the fluid is supplied to a target object; and a return selection means for selecting a circulation supply system through which the fluid that is supplied to the target object is returned (see, e.g., Japanese Patent Application Laid-Open (kokai) No. H11-184537). In the temperature control device described in Japanese Patent Application Laid-Open (kokai) No. H11-184537, when a temperature of the fluid that has returned from the target object reaches a predefined changing temperature after the circulation supply system that supplies the fluid to the target object is changed, a destination to which the fluid is returned is changed to the circulation supply system from which the fluid is supplied. According to the temperature control system, the high temperature fluid that remains between the supply selection means and the return selection means is less likely to return to the high temperature circulation supply system and to be mixed in the low temperature circulation supply system when the circulation system to supply the fluid to the target object is switched from the high temperature circulation supply system to the low temperature circulation supply system and thus a significant change in temperature is less likely to occur in the low temperature circulation supply system.

However, in practice, the fluid at relatively high temperature flows into the low temperature circulation supply system in a certain period of time after the circulation system to which the fluid is returned is changed from the high temperature circulation supply system to the low temperature circulation supply system, which is the fact on which the present discloser has focused. The present discloser has determined that the target object holds heat in the amount corresponding to its heat capacity and temperature and thus the low temperature fluid that is to be returned is heated while the heat remains. When the fluid at relatively high temperature flows into the low temperature circulation supply system, the peak value of the energy consumption of the chiller to cool the fluid increases in the low temperature circulation supply system. Especially in a facility equipped with some hundreds to thousands of temperature control systems such as above, the peak value of energy consumption of the entire facility may become enormous.

SUMMARY

One or more embodiments of the present disclosure provide a temperature control system in which an increase in peak value of energy consumption is less likely to occur to change a temperature of a target object.

One aspect of the present disclosure provides a temperature control system of controlling a temperature of a target object. The temperature control system includes a first chiller, a first supply valve, a first tank, a first return valve, a first target object bypass channel, a first on-off valve, a first tank bypass channel, a first mixing valve, a second chiller, a second supply valve, a second tank, a second return valve, a second target object bypass channel, a second on-off valve, a second tank bypass channel, a second mixing valve, and a controller. The first chiller adjusts a temperature of a fluid to a first temperature and pumps out the fluid. The first supply valve controls (i.e., allows and blocks) a supply of the fluid from the first chiller to the target object. The first tank holds the fluid that is returned from the target object to the first chiller up to a first fluid capacity and drains the fluid by an amount that exceeds the first fluid capacity. The first return valve controls (i.e., allows and blocks) a return of the fluid from the target object to the first tank. The first target object bypass channel allows the fluid to bypass the target object and to return upstream of the first tank. The first on-off valve opens and closes the first target object bypass channel. The first tank bypass channel allows the fluid to bypass the first tank and to return downstream of the first tank. The first mixing valve adjusts a mixing ratio of the fluid that flows from the first tank into the first chiller to the fluid that flows from the first tank bypass channel into the first chiller. The second chiller adjusts a temperature of the fluid to a second temperature that is lower than the first temperature and pumps out the fluid. The second supply valve controls (i.e., allows and blocks) a supply of the fluid from the second chiller to the target object. The second tank holds the fluid that is returned from the target object to the second chiller up to a second fluid capacity and drains the fluid by an amount that exceeds the second fluid capacity. The second return valve controls (i.e., allows and blocks) a return of the fluid from the target object to the second tank. The second target object bypass channel allows the fluid to bypass the target object and to return upstream of the second tank. The second on-off valve opens and closes the second target object bypass channel. The second tank bypass channel allows the fluid to bypass the second tank and to return downstream of the second tank. The second mixing valve adjusts a mixing ratio of the fluid that flows from the second tank into the second chiller to the fluid that flows from the second tank bypass channel into the second chiller. The controller controls the first supply valve, the first return valve, the first on-off valve, the first mixing valve, the second supply valve, the second return valve, the second on-off valve, and the second mixing valve.

According to the configuration, the temperature controls system controls the temperature of the target object. The first chiller adjusts the temperature of the fluid to the first temperature and pumps out the fluid. The first supply valve allows and blocks the flow of the fluid from the first chiller to the target object. The first tank holds the fluid that is returned from the target object to the first chiller up to the first fluid capacity and drains the fluid by the amount that exceeds the first fluid capacity. The first return valve allows and blocks the return of the fluid from the target object to the first tank. The first target object bypass channel allows the fluid to bypass the target object and to return upstream of the first tank. The first on-off valve opens and closes the first target object bypass channel. Through the controls of the first supply valve, the first return valve, and the first on-off valve by the controller, a state of the temperature control system can be switched between a state in which the fluid at the first temperature is supplied to the target object and returned upstream of the first tank and a state in which the fluid at the first temperature flows through the first target object bypass channel to bypass the target object and returns upstream of the first tank. Similarly, through the controls of the second supply valve, the second return valve, and the second on-off valve by the controller, the state of the temperature control system can be switched between a state in which the fluid at the second temperature is supplied to the target object and returned upstream of the second tank and a state in which the fluid at the second temperature flows through the second target object bypass channel to bypass the target object and returns upstream of the second tank.

The state can be switched between the first state and the second state. In the first state, the fluid at the first temperature is supplied to the target object and returned upstream of the first tank, the fluid at the second temperature flows through the second target object bypass channel to bypass the target object and returns upstream of the second tank, and the flow of the fluid from the target object to the second tank is blocked by the second return valve. In the second state, the fluid at the second temperature is supplied to the target object and returned upstream of the second tank, the fluid at the first temperature flows through the first target object bypass channel to bypass the target object and returns upstream of the first tank, and the flow of the fluid from the target object to the first tank is blocked by the first return valve. According to the configuration, the temperature of the target object can be changed.

Here, the second tank bypass channel allows the fluid to bypass the second tank and to return downstream of the second tank. The second mixing valve adjusts the mixing ratio of the fluid that flows from the second tank into the second chiller to the fluid that flows from the second tank bypass channel to the second chiller. According to the configuration, after the state is switched from the first state to the second state, the fluid flows from the second tank into the second chiller and the flow of the fluid from the second tank bypass channel into the second chiller is blocked. Further, the state is switched from the first state to the second state after the flow of the fluid from the first chiller to the target object is blocked and the fluid is supplied from the second chiller to the target object, and then the flow of the fluid from the second tank into the second chiller is allowed and the flow of the fluid from the second tank bypass channel to the second chiller is blocked. Therefore, the fluid at the temperature higher than the second temperature is less likely to flow into the second chiller and thus an increase in peak value of power consumption of the second chiller is less likely to occur. Further, while the heat in the amount corresponding to the heat capacity and the temperature of the target object remains, the flow of the fluid from the second tank into the second chiller is allowed and the flow of the fluid from the second tank bypass channel into the second chiller is blocked. According to the configuration, the fluid that is heated due to the heat that remains in the target object is less likely to return to the second chiller. Therefore, the increase in peak energy of the power consumption of the second chiller is further less likely to occur.

Then, the flow rate of the fluid that flows from the second tank into the second chiller is reduced and the flow rate of the fluid that flows from the second tank bypass channel into the second chiller is increased. According to the configuration, the fluid at the temperature higher than the second temperature gradually flows into the second chiller. Therefore, an increase in peak value of the power consumption of the second chiller is less likely to occur when the fluid at the temperature higher than the second temperature held in the second tank is released. Similarly, an increase in peak value of the power consumption of the first chiller is less likely to occur when the state is switched from the second state to the first state.

In a second aspect, the controller may switch the state between the first state and the second state. In the first state, the controller may control the first supply valve to supply the fluid from the first chiller to the target object, control the first return valve to return the fluid from the target object to the first tank, control the first on-off valve to close the first target object bypass channel, control the second supply valve to block a flow of the fluid from the second chiller to the target object, control the second return valve to block a flow of the fluid from the target object to the second tank, and control the second on-off valve to open the second target object bypass channel. In the second state, the controller may control the first supply valve to block a flow of the fluid from the first chiller to the target object, control the first return valve to block a flow of the fluid from the target object to the first tank, control the first on-off valve to open the first target object bypass channel, control the second supply valve to supply the fluid from the second chiller to the target object, control the second return valve to return the fluid from the target object to the second tank, and control the second on-off valve to close the second target object bypass channel.

According to the configuration, through the switching of the state to the first state by the controller, the fluid at the first temperature is supplied to the target object and returned upstream of the first tank, the fluid at the second temperature flows through the second target object bypass channel to bypass the target object and returns upstream of the second tank, and the flow of the fluid from the target object to the second tank is blocked. Further, through the switching of the state to the second state by the controller, the fluid at the second temperature is supplied to the target object and returned upstream of the second tank, the fluid at the first temperature flows through the first target object bypass channel to bypass the target object and returns upstream of the first tank, and the flow of the fluid from the target object to the first tank is blocked by the first return valve.

In a third aspect, in the first state, the controller may control the first mixing valve to allow the flow of the fluid from the first tank into the first chiller and the flow of the fluid from the first tank bypass channel into the first chiller, and control the second mixing valve to allow the flow of the fluid from the second tank into the second chiller and the flow of the fluid from the second tank bypass channel into the second chiller. According to the configuration, in the first state, the fluid at the first temperature is held in the first tank and the temperature of the first tank bypass channel is less likely to deviate from the first temperature. Further, in the first state, the fluid at the second temperature is held in the second tank and the temperature of the second tank bypass channel is less likely to deviate from the second temperature.

In a fourth aspect, the second fluid capacity may be defined by adding an amount of the fluid based on the heat capacity of the target object to the fluid capacity of the target object. When the state is switched from the first state to the second state, the controller may start a control of the second mixing valve to allow a flow of the fluid from the second tank into the second chiller and to block a flow of the fluid from the second tank bypass channel into the second chiller. When an amount of the fluid that has flowed into the second tank since switching of the state from the first state to the second state reaches the second fluid capacity, the controller may start a control of the second mixing valve to allow the flow of the fluid from the second tank into the second chiller in the amount less than an amount of the fluid that flows from the second tank bypass channel into the second chiller.

According to the configuration, when the state is switched from the first state to the second state, the controller may start the controls of the second mixing valve to allow the flow of the fluid from the second tank into the second chiller and to block the flow of the fluid from the second tank bypass channel into the second chiller. Therefore, the flow of the fluid at the temperature higher than the second temperature is less likely to flow into the second chiller and thus an increase in peak value of the power consumption of the second chiller is less likely to occur.

Here, the second fluid capacity may be defined by adding the amount of the fluid based on the heat capacity of the target object to the fluid capacity of the target object. The controller may maintain the state of the second mixing valve until the amount of the fluid that has flowed into the second tank since the switching of the state is switched from the first state to the second state reaches the second fluid capacity. According to the configuration, the fluid that is heated due to the heat that remains in the target object is less likely to return to the second chiller after the amount of the fluid that has flowed into the second tank reaches the amount corresponding to the fluid capacity of the target object. Therefore, the increase in peak value of the power consumption of the second chiller is further less likely to occur. Then, the controller may start the control of the second mixing valve to allow the flow of the fluid from the second tank into the second chiller in the amount less than the amount of the fluid that flows from the second tank bypass channel into the second chiller. According to the configuration, an increase in peak value of the power consumption of the second chiller is less likely to occur when the fluid at the temperature higher than the second temperature in the second tank is released.

In a fifth aspect, the second fluid capacity may be defined by adding an amount of the fluid based on the heat capacity of the target object to the fluid capacity of the target object. When the state is switched from the first state to the second state, the controller may start a control of the second mixing valve to allow a flow of the fluid from the second tank bypass channel into the second chiller in the amount less than an amount of the fluid that flows from the second tank into the second chiller. When a total amount of the fluid that has flowed into the second tank and the second tank bypass channel since switching of the state from the first state to the second state reaches the second fluid capacity, the controller may start a control of the second mixing valve to allow a flow of the fluid from the second tank into the second chiller in the amount less than an amount of the fluid that flows from the second tank bypass channel into the second chiller.

According to the configuration, when the state is switched from the first state to the second state, the controller may start the control of the second mixing valve to allow the flow of the fluid from the second tank bypass channel into the second chiller in the amount less than the amount of the fluid that flows from the second tank into the second chiller. According to the configuration, the fluid at the temperature higher than the second temperature is less likely to flow into the second chiller and thus an increase in peak value of the power consumption of the second chiller is less likely to occur. Then, similar to the fourth aspect, an increase in peak value of the power consumption of the second chiller is less likely to occur.

In a sixth aspect, the second fluid capacity may be defined based on the heat capacity of the target object. The controller may control the first supply valve to block the flow of the fluid from the first chiller to the target object and control the second supply valve to supply the fluid from the second chiller to the target object, and when the amount of the fluid that has flowed into the first chiller since then reaches the fluid capacity of the target object, the controller may switch the state from the first state to the second state. When the state is switched to the second state, the controller may start the control of the second mixing valve to allow the flow of the second tank into the second chiller and to block the flow of the fluid from the second tank bypass channel into the second chiller. When the amount of the fluid that has flowed into the second tank since the switching of the state to the second state reaches the second fluid capacity, the controller may start the control of the second mixing valve to allow the flow of the fluid from the second tank into the second chiller in the amount less than the amount of the fluid that flow from the second tank bypass channel into the second chiller.

According to the configuration, the controller may control the first supply valve to block the flow of the fluid from the first chiller to the target object and control the second supply valve to supply the fluid from the second chiller to the target object in the first state. According to the configuration, the flow of the fluid at the first temperature is less likely to flow into the second chiller when the state is switched from the state in which the fluid at the first temperature is supplied from the first chiller to the target object to the state in which the fluid at the second temperature is supplied from the second chiller to the target object. When the amount of the fluid that has flowed into the first chiller since then reaches the fluid capacity of the target object, the controller may switch the state from the first state to the second state. Therefore, the fluid in the amount corresponding to the fluid capacity of the target object is less likely to flow into the second chiller and thus an increase in peak value of the power consumption of the second chiller is less likely to occur.

Here, the second fluid capacity may be defined based on the heat capacity of the target object. When the state is switched to the second state, the controller may start the control of the second mixing valve to allow the flow of the fluid from the second tank into the second chiller and to block the flow of the fluid from the second tank bypass channel into the second chiller. According to the configuration, the fluid that is heated due to the heat that remains in the target object is less likely to return to the second chiller after the amount of the fluid that has flowed into the first chiller reaches the amount corresponding to the fluid capacity of the target object. Therefore, the increase in peak value of the power consumption of the second chiller is further less likely to occur. When the amount of the fluid that has flowed into the second tank since the switching of the state to the second state reaches the second fluid capacity, the controller may start the control of the second mixing valve to allow the flow of the fluid from the second tank into the second chiller in the amount less than the amount of the fluid that has flowed from the second tank bypass channel into the second chiller. According to the configuration, an increase in peak value of the power consumption of the second chiller is less likely to occur when the fluid at the temperature higher than the second temperature in the second tank is released.

Further, because the flow of the fluid into the second tank is allowed after the amount of the fluid that has flowed into the first chiller reaches the amount corresponding to the fluid capacity of the target object, the second fluid capacity of the second tank can be reduced in comparison to the fifth aspect.

In a seventh aspect, the second fluid capacity may be defined based on the heat capacity of the target object. The controller may control the first supply valve to block the flow of the fluid from the first chiller to the target object and control the second supply valve to supply the fluid from the second chiller to the target object, when the amount of the fluid that has flowed into the first chiller since then reaches the fluid capacity of the target object, the controller may switch the state from the first state to the second state. When the state is switched to the second state, the controller may start the control of the second mixing valve to allow the flow of the fluid from the second tank bypass channel into the second chiller in the amount less than the amount of the fluid that flows from the second tank into the second chiller. When a total amount of the fluid that has flowed into the second tank and the second tank bypass channel since the switching of the state to the second state reaches the second fluid capacity, the controller may start the control of the second mixing valve to allow the flow of the fluid from the second tank into the second chiller in the amount less than the amount of the fluid that flows from the second tank bypass channel into the second chiller.

According to the configuration, similar to the sixth aspect, the fluid at the first temperature is less likely to flow into the second chiller when the state is switched from the state in which the fluid at the first temperature is supplied from the first chiller to the target object to the state in which the fluid at the second temperature is supplied from the second chiller to the target object. Further, the fluid in the amount corresponding to the fluid capacity of the target object is less likely to flow into the second chiller. Thus, an increase in peak value of the power consumption of the second chiller is less likely to occur.

Here, the second fluid capacity may be defined based on the heat capacity of the target object. When the state is switched to the second state, the controller may start the control of the second mixing valve to allow the flow of the fluid from the second tank bypass channel into the second chiller in the amount less than the amount of the fluid that flows from the second tank into the second chiller. According to the configuration, the fluid at the temperature higher than the second temperature is less likely to flow into the second chiller and thus an increase in peak value of the power consumption of the second chiller is less likely to occur. Similar to the sixth aspect, an increase in peak value of the power consumption of the second chiller is less likely to occur.

In an eighth aspect, the first fluid capacity may be defined based on the heat capacity of the target object. The second fluid capacity may be defined based on the heat capacity of the target object. The controller may control the first supply valve to block the flow of the fluid from the first chiller to the target object, control the second supply valve to supply the fluid from the second chiller to the target object, controls the first mixing valve to block the flow of the fluid from the first tank into the first chiller and to allow the flow of the fluid from the first tank bypass channel into the first chiller, when the amount of the fluid that has flowed into the first tank bypass channel since then reaches the fluid capacity of the target object, control the first mixing valve to allow the flow of the fluid from the first tank into the first chiller and to block the flow of the fluid from the first tank bypass channel into the first chiller, when the amount of the fluid that has flowed into the first tank since then reaches the fluid capacity of the target object, control the first mixing valve to allow the flow of the fluid from the first tank into the first chiller in the amount less than the amount of the fluid that flows from the first tank bypass channel into the first chiller, switch the state from the first state to the second state, and control the second mixing valve to allow the flow of the fluid from the second tank into the second chiller and to block the flow of the fluid from the second tank bypass channel into the second chiller. When the amount of the fluid that has flowed into the second tank since the switching of the state to the second state reaches the second fluid capacity, the controller may control the second mixing valve to allow the flow of the fluid from the second tank into the second chiller in the amount less than the amount of the fluid that flows from the second tank bypass channel into the second chiller.

According to the configuration, the fluid that has returned from the target object at the temperature higher than the second temperature can be divided and held in the first tank and the second tank. Therefore, the temperature of the fluid that flows from the first tank into the first chiller is less likely to deviate from the first temperature and the temperature of the fluid that flows from the second tank into the second chiller is less likely to deviate from the second temperature. In comparison to the sixth aspect, the total power consumption of the first chiller and the second chiller can be reduced.

In a ninth aspect, the first fluid capacity may be defined based on the heat capacity of the target object and the second fluid capacity may be defined based on the heat capacity of the target object. The controller may control the first supply valve to block the flow of the fluid from the first chiller to the target object, control the second supply valve to supply the fluid from the second chiller to the target object, control the first mixing valve to block the flow of the fluid from the first tank into the first chiller and to allow the flow of the fluid from the first tank bypass channel into the first chiller, when the amount of the fluid that has flowed into the first tank bypass channel since then reaches the fluid capacity of the target object, control the first mixing valve to allow the flow of the fluid from the first tank bypass channel into the first chiller in the amount less than the amount of the fluid that flows from the first tank into the first chiller, when the total amount of the fluid that has flowed into the first tank and the first tank bypass channel since then reaches the first fluid capacity, control the first mixing valve to allow the flow of the fluid from the first tank into the first chiller in the amount less than the amount of the fluid that flows from the first tank bypass channel into the first chiller, switch the state from the first state to the second state, and control the second mixing valve to allow the flow of the fluid from the second tank bypass channel into the second chiller with the amount less than the amount of the fluid that flows from the second tank into the second chiller. When the total amount of the fluid that has flowed into the second tank and the second tank bypass channel since the switching of the state to the second state reaches the second fluid capacity, the controller controls the second mixing valve to allow the flow of the fluid from the second tank into the second chiller in the amount less than the amount of the fluid that flows from the second tank bypass channel into the second chiller.

According to the configuration, in comparison to the eighth aspect, the controller may control the first mixing valve to allow the flow of the fluid that flows from the first tank bypass channel into the first chiller in the amount less than the amount of the fluid that flows from the first tank into the first chiller. Therefore, the fluid at the temperature lower than the first temperature is less likely to flow into the first chiller and thus an increase in peak value of the power consumption of the first chiller is less likely to occur. Further, the controller may control the second mixing valve to allow the flow of the fluid from the second tank bypass channel into the second chiller in the amount less than the amount of the fluid that flows from the second tank into the second chiller. According to the configuration, the fluid at the temperature higher than the second temperature is less likely to flow into the second chiller and thus an increase in peak value of the power consumption of the second chiller is less likely to occur.

In a tenth aspect, a first heat accumulator may be disposed between the first mixing valve and the first chiller to store thermal energy based on a change in state of a first heat storage medium at a third temperature at passing of the fluid through the first heat accumulator. The third temperature may be higher than the temperature of the fluid that is held in the first tank after the state is switched from a state in which the fluid is supplied to the target object via the second supply valve to a state in which the fluid is supplied to the target object via the first supply valve and lower than the first temperature. A second heat accumulator may be disposed between the second mixing valve and the second chiller to store thermal energy based on a change in state of a second heat storage medium at a fourth temperature at passing of the fluid through the second heat accumulator. The fourth temperature may be lower than the temperature of the fluid that is held in the second tank after the state is switched from the state in which the fluid is supplied to the target object via the first supply valve to a state in which the fluid is supplied to the target object via the second supply valve and higher than the second temperature.

According to the configuration, the fluid may be passed through the first heat accumulator, and based on the change in state of the first heat storage medium at the third temperature, the first heat accumulator may store the thermal energy. Here, the third temperature may be lower than the first temperature. In the second state, the state of the first heat storage medium may be changed through the passing of the fluid at the temperature higher than the third temperature through the first heat accumulator and thus the thermal energy may be stored in the first heat accumulator. After the state is switched from the second state to the first state, the fluid that is held in the first tank at the temperature lower than the third temperature can be returned to the first chiller via the first heat accumulator. With the thermal energy stored in the first heat accumulator, the fluid that returns from the first tank to the first chiller can be heated. Therefore, the fluid at the temperature lower than the third temperature is less likely to return to the first chiller and thus an increase in peak value of the power consumption of the first chiller is less likely to occur. Similarly, an increase in peak value of the power consumption of the second chiller is less likely to occur after the state is switched from the first state to the second state.

An eleventh aspect provides a temperature control system of controlling a temperature of a target object. The temperature control system includes a first chiller, a first supply valve, a tank, a first return valve, a first target object bypass channel, a first on-off valve, a first tank bypass channel, a first tank return valve, a first mixing valve, a second chiller, a second supply valve, a second return valve, a second target object bypass channel, a second on-off valve, a second tank bypass channel, a second tank return valve, a second mixing valve, and a controller. The first chiller adjusts a temperature of a fluid to a first temperature and pumps out the fluid. The first supply valve allows and blocks a supply of the fluid from the first chiller to the target object. The tank holds the fluid that returns from the target object up to a fluid capacity and drains the fluid by an amount that exceeds the fluid capacity. The first return valve allows and blocks returns of the fluid from the target object to the tank and the first chiller. The first target object bypass channel allows the fluid to bypass the target object and to return downstream of the first return valve. The first on-off valve opens and closed the first target object bypass channel. The first tank bypass channel allows the fluid to bypass the tank and to return from downstream sides of the first return valve and the first target object bypass channel to a downstream side of the tank. The first tank return valve controls (i.e., allows and blocks) returns of the fluid from the downstream sides of the first return valve and the first target object bypass channel to the tank. The first mixing valve adjusts a mixing ratio of the fluid that flows from the tank into the first chiller to the fluid that flows from the first tank bypass channel into the first chiller. The second chiller adjusts a temperature of the fluid to a second temperature that is lower than the first temperature and pumps out the fluid. The second supply valve allows and blocks a supply of the fluid from the second chiller to the target object. The second return valve allows and blocks returns of the fluid from the target object to the tank and the second chiller. The second target object bypass channel allows the fluid to bypass the target object and to return downstream of the second return valve. The second on-off valve opens and closes the second target object bypass channel. The second tank bypass channel allows the fluid to bypass the tank and to return from downstream sides of the second return valve and the second target object bypass channel to a downstream side of the tank. The second tank return valve controls (i.e., allows and blocks) returns of the fluid from the downstream sides of the second return valve and the second target object bypass channel to the tank. The second mixing valve adjusts a mixing ratio of the fluid that flows from the tank into the second chiller to the fluid that flows from the second tank bypass channel into the second chiller. The controller controls the first supply valve, the first return valve, the first on-off valve, the first tank return valve, the first mixing valve, the second supply valve, the second return valve, the second on-off valve, the second tank return valve, and the second mixing valve.

According to the configuration, the temperature control system controls the temperature of the target object. The first chiller adjusts the temperature of the fluid to the first temperature and pumps out the fluid. The first supply valve allows and blocks the supply of the fluid from the first chiller to the target object. The tank holds the fluid that returns from the target object up to the fluid capacity and drains the fluid by the amount that exceeds the fluid capacity. The first return valve allows and blocks the returns of the fluid from the target object to the tank and the first chiller. The first target object bypass channel allows the fluid to bypass the target object and to return downstream of the first return valve. The first on-off valve opens and closes the first target object bypass channel. Through the controls of the first supply valve, the first return valve, and the first on-off valve by the controller, a state of the temperature control system can be switched between a state in which the fluid at the first temperature is supplied to the target object and returned upstream of the tank and the first chiller and a state in which the fluid at the first temperature flows through the first target object bypass channel to bypasses the target object and returns downstream of the first return valve. Similarly, through the controls of the second supply valve, the second return valve, and the second on-off valve by the controller, the state of the temperature control system can be switched between a state in which the fluid at the second temperature is supplied to the target object and returned upstream of the tank and the second chiller and a state in which the fluid at the second temperature flows through the second target object bypass channel to bypasses the target object and returns downstream of the second return valve.

Further, the state can be switched between the first state and the second state. In the first state, the fluid at the first temperature is supplied to the target object and returned upstream of the tank and the first chiller, the fluid at the second temperature flows through the second target object bypass channel to bypass the target object and returns downstream of the second return valve, and the flows of the fluid from the target object to the tank and the second chiller are blocked by the second return valve. In the second state, the fluid at the second temperature is supplied and returned upstream of the tank and the second chiller, the fluid at the first temperature flows through the first target object bypass channel to bypass the target object and returns downstream of the first return valve, and the flows of the fluid from the target object to the tank and the first chiller are blocked by the first return valve. According to the configuration, the temperature of the target object can be changed.

Here, the second tank bypass channel allows the fluid to bypass the tank and to return from the downstream sides of the second return valve and the second target object bypass channel to the downstream side of the tank. The second tank return valve allows and blocks the returns of the fluid from the downstream sides of the second return valve and the second target object bypass channel to the tank. The second mixing valve adjusts the mixing ratio of the fluid that flows from the tank into the second chiller to the fluid that flows from the second tank bypass channel into the second chiller. Therefore, after the state is switched from the first state to the second state, the flow of the fluid from the tank into the second chiller may be allowed and the flow of the fluid from the second tank bypass channel into the second chiller may be blocked. Further, after the state is switched from the first state to the second state after the flow of the fluid from the first chiller to the target object is blocked and the fluid is supplied from the second chiller to the target object, the flow of the fluid the tank into the second chiller may be allowed and the flow of the fluid from the second tank bypass channel into the second chiller may be blocked. According to the configuration, the fluid at the temperature higher than the second temperature is less likely to flow into the second chiller and thus an increase in peak value of the power consumption of the second chiller is less likely to occur. Further, the flow of the fluid from the tank into the second chiller may be allowed and the flow of the fluid from the second tank bypass channel to the second chiller may be blocked while the heat in the amount corresponding to the heat capacity and the temperature of the target object remains and thus the fluid that is heated due to the heat that remains in the target object is less likely to return to the second chiller. Therefore, the increase in peak value of the power consumption of the second chiller is further less likely to occur.

Then, the flow rate of the fluid that flows from the tank into the first chiller is reduced and the flow rate of the fluid that flows from the first tank bypass channel into the first chiller is increased and thus the fluid at the temperature lower than the first temperature gradually flows into the first chiller. When the fluid that is held in the tank at the temperature lower than the first temperature is released, an increase in peak value of the power consumption of the first chiller is less likely to occur. Similarly, when the state is switched from the second state to the first state, an increase in peak value of the power consumption of the second chiller is less likely to occur.

In a twelfth aspect, the controller may switch the state between a first state and a second state. In the first state, the controller may control the first supply valve to supply the fluid from the first chiller to the target object, control the first return valve to return the fluid from the target object to the tank and the first chiller, control the first on-off valve to close the first target object bypass channel, control the second supply valve to block a flow of the fluid from the second hiller to the target object, control the second return valve to block flows of the fluid from the target object to the tank and the second chiller, and controls the second on-off valve to open the second target object bypass channel. In the second state, the controller may control the first supply valve to block the flow of the fluid from the first chiller to the target object, control the first return valve to block flows of the fluid from the target object to the tank and the first chiller, control the first on-off valve to open the first target bypass channel, control the second supply valve to supply the fluid from the second chiller to the target object, controls the second return valve to return the fluid from the target object to the tank and the second chiller, and control the second on-off valve to close the second target object bypass channel.

According to the configuration, through the switching of the state to the first state by the controller, the fluid at the first temperature may be supplied to the target object and returned upstream of the tank and the first chiller, the fluid at the second temperature may flow through the second target object bypass channel to bypass the target object and return downstream of the second return valve, and the flows of the fluid from the target object to the tank and the second chiller may be blocked. Further, through the switching of the state to the second state by the controller, the fluid at the second temperature may be supplied to the target object and returned upstream of the tank and the second chiller, the fluid at the first temperature may flow through the first target object bypass channel to bypass the target object and return downstream of the first return valve, and the flows of the fluid from the target object to the tank and the first chiller may be blocked.

In a thirteenth aspect, the controller, in the first state, may control the first tank return valve to block flows of the fluid from the downstream sides of the first return valve and the first target object bypass channel to the tank, control the first mixing valve to block a flow of the fluid from the tank into the first chiller and to allow the flow of the fluid from the first tank bypass channel into the first chiller, control the second tank return valve to return the fluid from the downstream sides of the second return valve and the second target object bypass channel to the tank, and control the second mixing valve to allow a flow of the fluid from the tank into the second chiller and a flow of the fluid from the second tank bypass channel into the second chiller.

According to the configuration, in the first state, the controller may control the first tank return valve to block the flows of the fluid from the downstream sides of the first return valve and the first target object bypass channel to the tank and control the first mixing valve to block the flow of the fluid from the tank into the first chiller and to allow the flow of the fluid from the first tank bypass channel into the first chiller. In the first state, the fluid at the first temperature is less likely to flow into the tank and the temperature of the first tank bypass channel is less likely to deviate from the first temperature. Further, in the first state, the controller may control the second tank return valve to return the fluid from the downstream sides of the second return valve and the second target object bypass channel to the tank and control the second mixing valve to allow the flow of the fluid from the tank into the second chiller and the flow of the second tank bypass channel into the second chiller. In the first state, the fluid at the second temperature is held in the tank and the temperature of the second tank bypass channel is less likely to deviate from the second temperature.

In a fourteenth aspect, the fluid capacity may be defined by adding an amount of the fluid based on a heat capacity of the target object to a fluid capacity of the target object. When the state is switched from the first state to the second state, the controller may start a control of the second mixing valve to allow a flow of the fluid from the tank into the second chiller and to block a flow of the fluid from the second tank bypass channel into the second chiller. When an amount of the fluid that has flowed into the tank since switching of the state from the first state to the second state reaches the fluid capacity, the controller may start a control of the second tank return valve to block a flow of the fluid to the tank, a control of the first tank return valve to return the fluid to the tank, and a control of the first mixing valve to allow a flow of the fluid from the tank into the first chiller in an amount less than an amount of the fluid that flows from the first tank bypass channel into the first chiller.

According to the configuration, when the state is switched from the first state to the second state, the controller may start the control of the second mixing valve to allow the flow of the fluid from the tank into the second chiller and to block the flow of the fluid from the second tank bypass channel into the second chiller. Therefore, the fluid at the temperature higher than the second temperature is less likely to flow into the second chiller and thus an increase in peak value of the power consumption of the second chiller is less likely to occur.

Here, the fluid capacity may be defined by adding the amount of the fluid based on the heat capacity of the target object to the fluid capacity of the target object. The control may maintain the state of the second mixing valve until the amount of the fluid that has flowed into the tank since the switching of the state from the first state to the second state reaches the fluid capacity. According to the configuration, the fluid at the temperature higher than the second temperature is less likely to return to the second chiller after the amount of the fluid has flowed into the tank reaches the amount corresponding to the fluid capacity of the target object. Therefore, the increase in peak value of the power consumption of the second chiller is further less likely to occur. Then, the controller may start the control of the second tank return valve to block the flow of the fluid to the tank, the control of the first tank return valve to return the fluid to the tank, and the control of the first mixing valve to allow the flow of the fluid from the tank into the first chiller in the amount less than the amount of the fluid that flows from the first tank bypass channel into the first chiller. According to the configuration, an increase in peak value of the power consumption of the first chiller is less likely to occur when the fluid at the temperature lower than the first temperature in the tank is released to the first chiller.

In a fifteenth aspect, the fluid capacity may be defined based on the heat capacity of the target object. The controller may control the first supply valve to block a flow of the fluid from the first chiller to the target object and control the second supply valve to supply the fluid from the second chiller to the target object, and when an amount of the fluid that has flowed into the first chiller since then reaches the fluid capacity of the target object, the controller may switch the state from the first state to the second state. When the state is switched to the second state, the controller may start a control of the second mixing valve to allow a flow of the fluid from the tank into the second chiller and to block a flow of the fluid from the second tank bypass channel into the second chiller. When an amount of the fluid that has flowed into the tank since switching of the state to the second state reaches the fluid capacity, the controller may start a control of the first tank return valve to return the fluid to the tank, a control of the second tank return valve to block the flow of the fluid to the tank, and a control of the first mixing valve to allow the flow of the fluid from the tank into the first chiller in an amount less than an amount of the fluid that flows from the first tank bypass channel into the first chiller.

According to the configuration, in the third state, the controller may control the first supply valve to block the flow of the fluid from the first chiller to the target object and the controller may control the second supply valve to supply the fluid from the second chiller to the target object. When the state is switched from the state in which the fluid at the first temperature is supplied from the first chiller to the target object to the state in which the fluid at the second temperature is supplied from the second chiller to the target object, the fluid at the first temperature is less likely to flow into the second chiller. Further, the controller may switch the state to the second state when the amount of the fluid that has flowed into the first chiller since then reaches the fluid capacity of the target object. Therefore, the fluid in the amount corresponding to the fluid capacity of the target object is less likely to flow into the second chiller and thus an increase in peak value of the power consumption of the second chiller is less likely to occur.

Here, the fluid capacity may be defined based on the heat capacity of the target object. When the state is switched to the second state, the controller may start the control of the second mixing valve to allow the flow of the fluid from the tank into the second chiller and to block the flow of the fluid from the second tank bypass channel into the second chiller. According to the configuration, the fluid at the temperature higher than the second temperature is less likely to return to the second chiller after the amount of the fluid that has flowed into the first chiller reaches the amount corresponding to the fluid capacity of the target object. Therefore, the increase in peak value of the power consumption of the second chiller is less likely to occur. Then, when the amount of the fluid that has flowed into the tank since the switching of the state to the second state reaches the fluid capacity, the controller may start the control of the first tank return valve to allow the flow of the fluid to the tank, the control of the second tank return valve to block the flow of the fluid to the tank, and the control of the first mixing valve to allow the flow of the fluid from the tank into the first chiller in the amount less than the amount of the fluid that flows from the first tank bypass channel into the first chiller. According to the configuration, an increase in peak value of the power consumption of the first chiller is less likely to occur when the fluid at the temperature lower than the first temperature in the tank is released to the first chiller.

Further, because the flow of the fluid into the tank may be allowed after the amount of the fluid that has flowed into the first chiller reaches the amount corresponding to the fluid capacity of the target object, the fluid capacity of the tank can be reduced in comparison to the fourteenth aspect.

In a sixteenth aspect, a first heat accumulator may be disposed between the first mixing valve and the first chiller to store thermal energy based on a change in state of a first heat storage medium at a third temperature at passing of the fluid through the first heat accumulator. The third temperature may be higher than a temperature of the fluid that is held in the tank after the state is switched from a state in which the fluid is supplied to the target object via the second supply valve to a state in which the fluid is supplied to the target object via the first supply valve and lower than the first temperature. A second heat accumulator may be disposed between the second mixing valve and the second chiller to store thermal energy based on a change in state of a second heat storage medium at a fourth temperature at passing of the fluid through the second heat accumulator. The fourth temperature may be lower than a temperature of the fluid that is held in the tank after the state is switched from a state in which the fluid is supplied to the target object via the first supply valve to a state in which the fluid is supplied to the target object via the second supply valve and higher than the second temperature.

According to the configuration, the fluid may be passed through the first heat accumulator, and based on the change in state of the first heat storage medium at the third temperature, the first heat accumulator may store the thermal energy. Here, the third temperature may be lower than the first temperature. In the second state, the state of the first heat storage medium is changed through the passing of the fluid at the temperature higher than the third temperature through the first heat accumulator and thus the thermal energy is stored in the first heat accumulator. After the state is switched from the second state to the first state, the fluid that is held in the tank at the temperature lower than the third temperature can be returned to the first chiller via the first heat accumulator. With the thermal energy stored in the first heat accumulator, the fluid that returns from the tank to the first chiller can be heated. Therefore, the fluid at the temperature lower than the third temperature is less likely to return to the first chiller and thus an increase in peak value of the power consumption of the first chiller is less likely to occur. Similarly, an increase in peak value of the power consumption of the second chiller is less likely to occur after the state is switched from the first state to the second state.

BRIEF DESCRIPTION OF THE DRAWINGS

The above and other objects, features, and advantages of the present disclosure will be apparent from the following detailed description made with reference to the accompanying drawings.

DETAILED DESCRIPTION OF EMBODIMENTS

Embodiments, each of which includes a temperature control system configured to control a temperature of a stage (a target object) in a plasma etching device, will be described with reference to the drawings. The target object is not limited to the stage in the plasma etching device and may be electrodes in a semiconductor processing device.

Figure 1:
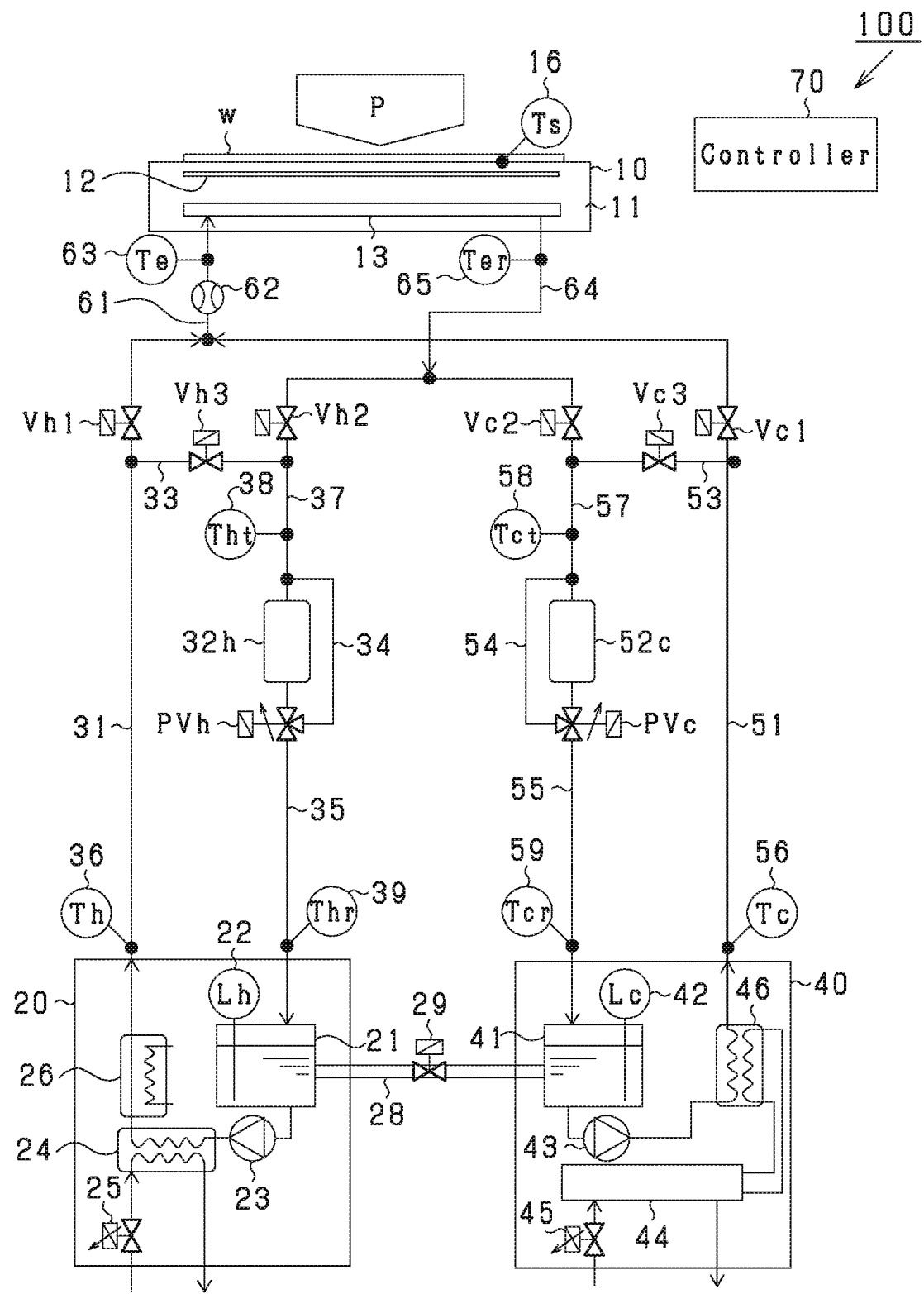
FIG. 1 is a circuit diagram of a temperature control system.

As illustrated in FIG. 1, a temperature control system 100 includes a stage 10, a first chiller 20, a first supply valve Vh1, a first tank 32h, a first return valve Vh2, a first on-off valve Vh3, a first mixing valve PVh, a second chiller 40, a second supply valve Vc1, a second tank 52c, a second return valve Vc2, a second on-off valve Vc3, a second mixing valve PVc, and a controller 70.

The first chiller 20 includes a tank 21, a fluid level sensor 22, a pump 23, a heat exchanger 24, a cooling water valve 25, and a heater 26. The tank 21 holds a heat medium. The heat medium (a fluid) is a fluorine-based inert liquid. The fluid level sensor 22 detects a fluid level of the heat medium in the tank 21 and inputs the detected fluid level to the controller 70. The pump 23 sucks the heat medium from the tank 21 and pumps out the heat medium to a first supply channel 31. The heat exchanger 24 exchanges heat between the heat medium that is pumped out by the pump 23 and cooling water. The cooling water valve 25 adjusts a flow rate of the cooling water that flows into the heat exchanger 24. The heater 26 heats the heat medium that is pumped out by the pump 23. Through controls of the pump 23, the cooling water valve 25, and the heater 26 by the controller 70, the first chiller 20 adjusts the temperature of the heat medium to 60 [° C.] (a first temperature) and pumps out the heat medium to the first supply channel 31.

The second chiller 40 includes a tank 41, a fluid level sensor 42, a pump 43, a refrigeration circuit 44, a cooling water valve 45, and a heat exchanger 46. The tank 41 holds the heat medium. The fluid level sensor 42 detects a fluid level of the heat medium in the tank 41 and inputs the detected fluid level to the controller 70. The pump 43 sucks the heat medium from the tank 41 and pumps out the heat medium to a second supply channel 51. The refrigeration circuit 44 cools a refrigerant and circulates the refrigerant in the heat exchanger 46. The cooling water valve 45 adjusts a flow rate of the cooling water that flows into the refrigeration circuit 44. The heat exchanger 46 exchanges heat between the heat medium that is pumped by the pump 43 and a coolant that is supplied by the refrigeration circuit 44. Through controls of the pump 43, the cooling water valve 45, and the refrigeration circuit 44 by the controller 70, the second chiller 40 adjusts the temperature of the heat medium to −10 [° C.] (a second temperature) and pumps out the heat medium to the second supply channel 51.

The tank 21 of the first chiller 20 and the tank 41 of the second chiller 40 are connected to each other via a balancing flow channel 28. A balancing valve 29 is disposed in the balancing flow channel 28. The balancing valve 29 opens and closes the balancing flow channel 28. When the balancing flow channel 28 is opened by the balancing valve 29, the heat medium flows in and out of the tank 21 and the tank 41 and thus an amount of the heat medium in the tank 21 and an amount of the heat medium in the tank 41 are balanced. The balancing valve 29 is controlled by the controller 70. The controller 70 controls the balancing valve 29 to open the balancing flow channel 28 in response to determination that an absolute value of a difference between the fluid level of the heat medium detected by the fluid level sensor 22 (the amount of the heat medium in the tank 21) and the fluid level of the heat medium detected by the fluid level sensor 42 (the amount of the heat medium in the tank 41) is greater than a predefined value.

A temperature sensor 36 and the first supply valve Vh1 are disposed in the first supply channel 31. The first supply valve Vh1 opens and closes the first supply channel 31. The temperature sensor 36 detects temperature Th of the heat medium that is supplied from the first chiller 20 to the first supply channel 31 and inputs the temperature Th to the controller 70. A section of the first supply channel 31 downstream of the first supply valve Vh1 is connected to a target object supply channel 61. The target object supply channel 61 is connected to the stage 10. The first supply valve Vh1 allows and blocks a supply of the heat medium from the first chiller 20 to the stage 10. A flow meter 62 and a temperature sensor 63 are disposed in the target object supply channel 61. The flow meter 62 detects the flow rate of the heat medium that flows through the target object supply channel 61 and inputs the flow rate to the controller 70. The temperature sensor 63 detects temperature Te of the heat medium that flows through the target object supply channel 61 and inputs the temperature Te to the controller 70.

The stage 10 is disposed in a chamber (not shown) of a plasma etching device. In the stage 10, a flow channel 13 through which the heat medium flows, a heater 12, and a temperature sensor 16 are disposed. The target object supply channel 61 is connected to an inlet of the flow channel 13. The heater 12 is controlled by the controller 70 to heat the stage 10. The temperature 16 detects temperature Ts of the stage 10 and inputs the temperature Ts to the controller 70. A workpiece W such as a wafer is attached to an upper surface of the stage 10. Then, etching is executed on the workpiece W with plasma P.

A target object return channel 64 is connected to an outlet of the flow channel 13. A temperature sensor 65 is disposed in the target object return channel 64. The temperature sensor 65 detects a temperature Ter of the heat medium that flows through the target object return channel 64 and inputs the temperature Ter to the controller 70. The first return channel 37 is connected to the target object return channel 64. The first return valve Vh2 is disposed in the first return channel 37. The first return valve Vh2 opens and closes the first return channel 37. The first tank 32*h* is connected to a section of the first return channel 37 downstream of the first return valve Vh2. The first return valve Vh2 allows and blocks a return of the heat medium from the stage 10 to the first tank 32*h*. A temperature sensor 38 is disposed in the first return channel 37. The temperature sensor 38 detects temperature Tht of the heat medium that flows through the first return channel 37, that is, the heat medium that is returned upstream of the first tank 32*h*, and inputs the temperature Tht to the controller 70.

The capacity of the first tank 32*h* to hold the heat medium is defined as a first fluid capacity MH. The first fluid capacity MH will be described later. The first tank 32*h* and the tank 21 of the first chiller 20 are connected by a first return channel 35. The first tank 32*h* holds the heat medium that returns from the stage 10 to the first chiller 20 up to the first fluid capacity MH and drains the heat medium by an amount that exceeds the first fluid capacity MH. A heat medium flow channel is disposed in the first tank 32*h*. The heat medium that flows into the first tank 32*h* flows through the heat medium flow channel and drains from the first tank 32*h*. Namely, the heat medium that flows into the first tank 32*h* is less likely to be mixed with the heat medium that has been held in the first tank 32*h*.

A section of the first supply channel 31 upstream of the first supply valve Vh1 and a section of the first return channel 37 downstream of the first return valve Vh2 are connected by a first target object bypass channel 33. The first target object bypass channel 33 allows the heat medium to bypass the stage 10 and to return upstream of the first tank 32*h*. A first on-off valve Vh3 is disposed in the first target object bypass channel 33. The first on-off valve Vh3 opens and closes the first target object bypass channel 33. The first on-off valve Vh3 is controlled by the controller 70.

A section of the first return channel 37 between the first return valve Vh2 and the first tank 32*h* and a section of the first return channel 35 between the first tank 32*h* and the first chiller 20 are connected by a first tank bypass channel 34. The first tank bypass channel 34 allows the heat medium to bypass the first tank 32*h* and to return downstream of the first tank 32*h*. A first mixing valve PVh is disposed at a joint between the first return channel 35 and the first tank bypass channel 34. The first mixing valve PVh adjusts a mixing ratio of the heat medium that flows from the first tank 32*h* into the first chiller 20 to the heat medium that flows from the first tank bypass channel 34 into the first chiller 20. A temperature sensor 39 is disposed in the first return channel 35. The temperature sensor 39 detects a temperature Thr of the heat medium that flows through the first return channel 35, that is, the heat medium that returns to the first chiller 20, and inputs the temperature Thr to the controller 70.

The first chiller 20, the first supply channel 31, the first supply valve Vh1, the first return channel 37, the first return valve Vh2, the first target object bypass channel 33, the first on-off valve Vh3, the first tank 32*h*, the first tank bypass channel 34, the first mixing valve PVh, and the first return channel 35 constitute a high temperature circulation supply system.

The temperature control system 100 includes a low temperature circulation supply system that is paired with the high temperature circulation supply system. The low temperature circulation supply system includes the second chiller 40, the second supply channel 51, the second supply valve Vc1, a second return channel 57, the second return valve Vc2, a second target object bypass channel 53, the second on-off valve Vc3, the second tank 52c, a second tank bypass channel 54, the second mixing valve PVc, and a second return channel 55. Functions of components of the low temperature circulation supply system are similar to functions of corresponding components of the high temperature circulation supply and thus they will not be described.

A temperature sensor 56 and the second supply valve Vc1 are disposed in the second supply channel 51. A section of the second supply channel 51 downstream of the second supply valve Vc1 is connected to the target object supply channel 61. The second supply valve Vc1 allows and blocks a supply of the heat medium from the second chiller 40 to the stage 10.

The second return channel 57 is connected to the target object return channel 64. The second return valve Vc2 is disposed in the second return channel 57. The second tank 52c is connected to a section of the second return channel 57 downstream of the second return valve Vc2. The second return valve Vc2 allows and blocks a return of the heat medium from the stage 10 to the second tank 52c. A temperature sensor 58 is disposed in the second return channel 57.

The capacity of the second tank 52c to hold the heat medium is defined as a second fluid capacity MC. The second fluid capacity MC will be described later. The second tank 52c and the tank 41 of the second chiller 40 are connected by a second return channel 55. The second tank 52c holds the heat medium that returns from the stage 10 to the second chiller 40 up to the second fluid capacity MC and drains the heat medium by an amount that exceeds the second fluid capacity MC.

A section of the second supply channel 51 upstream of the second supply valve Vc1 and a section of the second return channel 57 downstream of the second return valve Vc2 are connected by the second target object bypass channel 53. The second target object bypass channel 53 allows the heat medium to bypass the stage 10 and to return upstream of the second tank 52c. The second on-off valve Vc3 is disposed in the second target object bypass channel 53.

A section of the second return channel 57 between the second return valve Vc2 and the second tank 52c and a section of the second return channel 55 between the second tank 52c are connected by the second tank bypass channel 54. The second tank bypass channel 54 allows the heat medium to bypass the second tank 52c and to return downstream of the second tank 52c. The second mixing valve PVc is disposed at a joint between the second return channel 55 and the second tank bypass channel 54. The temperature sensor 59 is disposed in the second return channel 55.

The controller 70 is composed of a microcomputer that includes a CPU, a ROM, a RAM, and an input/output interface. The controller 70 controls the first chiller 20, the first supply valve Vh1, the heater 12, the first return valve Vh2, the first on-off valve Vh3, the first mixing valve PVh, the second chiller 40, the second supply valve Vc1, the second return valve Vc2, the second on-off valve Vc3, and the second mixing valve PVc.

Figure 2:
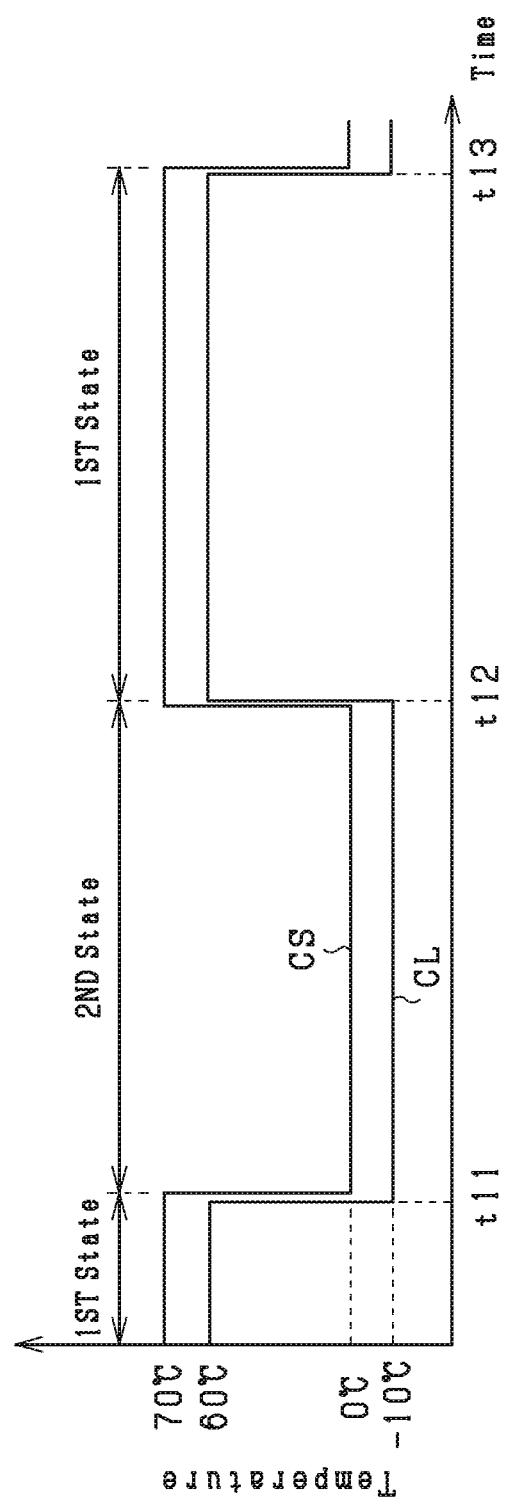
FIG. 2 is a time chart illustrating temperature control patterns.

FIG. 2 is a time chart illustrating patterns for controls of temperature of the stage 10 by the temperature control system 100. Here, it is assumed that the temperature control system 100 does not include the tanks 32h and 52, the tank bypass channels 34 and 54, and the mixing valves PVh and PVc.

The temperature control system 100 performs controls to maintain a first state until time t11, in which a stage temperature command CS (a target temperature of the stage 10) is 70 [° C.] and a medium temperature command CL (a target temperature of the heat medium supplied from the chiller 20) is 60 [° C.]. Note that the temperature of the stage 10 is expected to rise by about 10 [° C.] greater than the temperature of the heat medium due to the heat of the plasma P and the heat of the heater 12. In the first state, the controller 70 controls the first supply valve Vh1 to supply the heat medium from the first chiller 20 to the stage 10, controls the first return valve Vh2 to return the heat medium from the stage 10 to the first tank 32h, controls the first on-off valve Vh3 to close the first target object bypass channel 33, controls the second supply valve Vc1 to block the flow of the heat medium from the second chiller 40 to the stage 10, controls the second return valve Vc2 to block the flow of the heat medium from the stage 10 to the second tank 52c, and controls the second on-off valve Vc3 to open the second target object bypass channel 53.

Through the controls, in the high temperature circulation system, the heat medium that has been supplied from the first chiller 20 at 60 [° C.] flows into the stage 10 via the first supply channel 31 and the target object supply channel 61, through the flow channel 13 in the stage 10, and then into the target object return channel 64. The heat medium that flows into the target object return channel 64 returns to the first chiller 20 via the target object return channel 64 and the first return channels 37 and 35. In the low temperature circulation supply system, the heat medium that has been supplied from the second chiller 40 at −10 [° C.] returns to the second chiller 40 via the second supply channel 51, the second target object bypass channel 53, and the second return channels 57 and 55.

At time t11, the state is switched from the first state to a second state. The temperature control system 100 performs controls to maintain the second state in a period from time t11 to time t12, in which the state temperature command CS is 0 [° C.] and the medium temperature command CL is −10 [° C.]. In the second state, the controller 70 controls the first supply valve Vh1 to block the flow of the heat medium from the first chiller 20 to the stage 10, controls the first return valve Vh2 to block the flow of the heat medium from the stage 10 to the first tank 32h, controls the first on-off valve Vh3 to open the first target object bypass channel 33, controls the second supply valve Vc1 to supply the heat medium from the second chiller 40 to the stage 10, controls the second return valve Vc2 to return the heat medium from the stage 10 to the second tank 52, and controls the second on-off valve Vc3 to close the second target object bypass channel 53.

Through the controls, in the high temperature circulation supply system, the heat medium that has been supplied from the first chiller 20 at 60 [° C.] returns to the first chiller 20 via the first supply channel 31, the first target object bypass channel 33, and the first return channels 37 and 35. In the low temperature circulation supply system, the heat medium that has been supplied from the second chiller 40 at −10 [° C.] flows into the stage 10 via the second supply channel 51 and the target object supply channel 61, through the flow channel 13 in the stage 10, and then into the target object return channel 64. The heat medium that flows into the target object return channel 64 returns to the second chiller 40 via the target object return channel 64 and the second return channels 57 and 55.

At time t12, the state is switched from the second state to the first state, and the temperature control system 100 performs controls to maintain the first state in a period from time t12 to time t13. The controller 70 executes controls such that the state is repeatedly switched between the first state and the second state.

Figure 3:
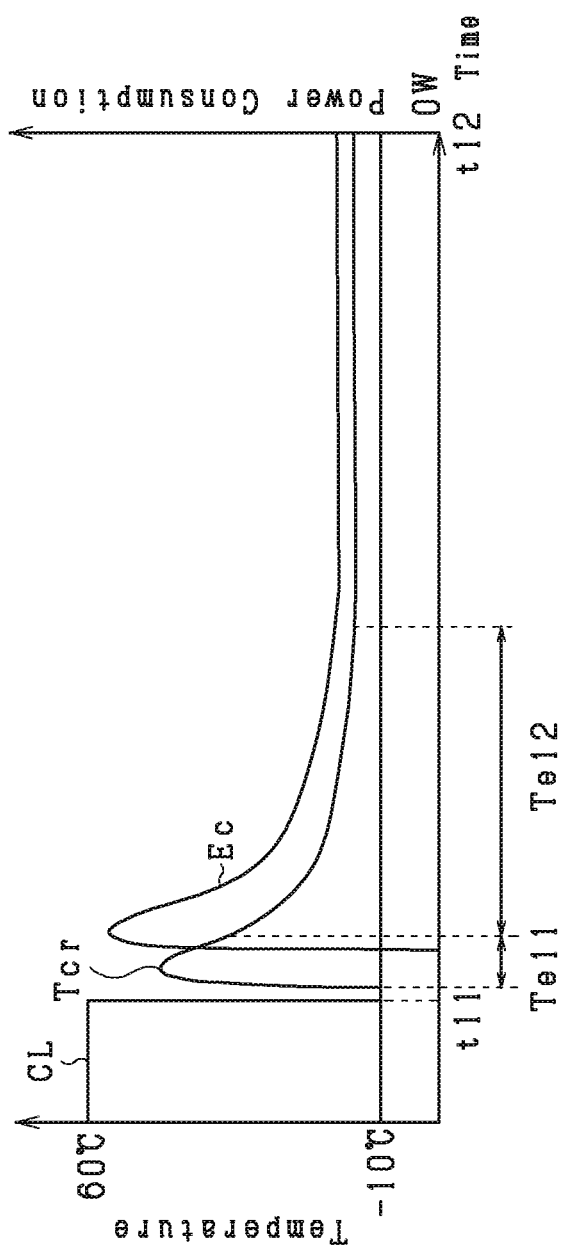
FIG. 3 is a time chart illustrating temperature Tcr of a heat medium that is returned to a second chiller and power consumption Ec of the second chiller when a state of the temperature control system is switched from a first state to a second state.

FIG. 3 is a time chart illustrating temperature Tcr of the heat medium that returns to the second chiller 40 and power consumption Ec of the second chiller 40 when the state is switched from the first state to the second state. Here, it is assumed that the temperature control system 100 does not include the tanks 32h and 52c, the tank bypass channels 34 and 54, and the mixing valves PVh and PVc.

When the state is switched from the first state to the second state at time t11, the supply of the heat medium at 60 [° C.] to the stage 10 stops and the supply of the heat medium at −10 [° C.] starts. At the same time, the return of the heat medium from the stage 10 to the first chiller 20 stops and the return of the heat medium from the stage 10 to the second chiller 40 starts. Therefore, the heat medium at 60 [° C.] flowing through the target object supply channel 61, the stage 10, and the target object return channel 64 (hereinafter referred to as "the exchange section") returns to the second chiller 40. As a result, the temperature Tcr of the heat medium that has returned to the second chiller 40 sharply rises after time t11. Note that the temperature Tcr of the heat medium starts rising behind time t11 by an amount of time required by the heat medium at 60 [° C.] flowing through the second return channels 57 and 55 to reach the second chiller 40.

In period Te11, the heat medium that has flowed through the exchange section flows into the second chiller 40. The length of the period Tel 1 can be calculated based on the heat medium capacity (fluid capacity) [L] of the exchange section and the flow rate [L/min] of the heat medium that is supplied from the second chiller 40. For example, if the fluid capacity of the exchange section is 5 [L] and the flow rate of the heat medium is 15 [L/min], the length of period Te11 is 20 [sec]. Because the heat medium at the temperature higher than −10 [° C.] flows into the second chiller 40, the power consumption Ec (energy consumption) of the second chiller 40 sharply increases after that.

In period Te12 after period Te11, the temperature Tcr of the heat medium that returns to the second chiller 40 continues to gradually decrease. The discloser of the present application investigated this matter and found that the exchange section had heat in an amount corresponding to its heat capacity and a difference in temperature from the heat medium that flowed into the exchange section, and the heat medium was heated and returned as long as the heat remained. The longer the target object supply channel 61 and the target object return channel 64 are, the greater the heat capacity of the exchange section is; however, the heat capacity of the exchange section includes at least the heat capacity of the stage 10. As the temperature Tcr of the heat medium decreases, the power consumption of the second chiller 40 decreases. When the period Te12 ends, the temperature Tcr of the heat medium increases from −10 [° C.] due to the heat of the plasma P and the heat of the heater 12 and then stays constant.

Figure 4:
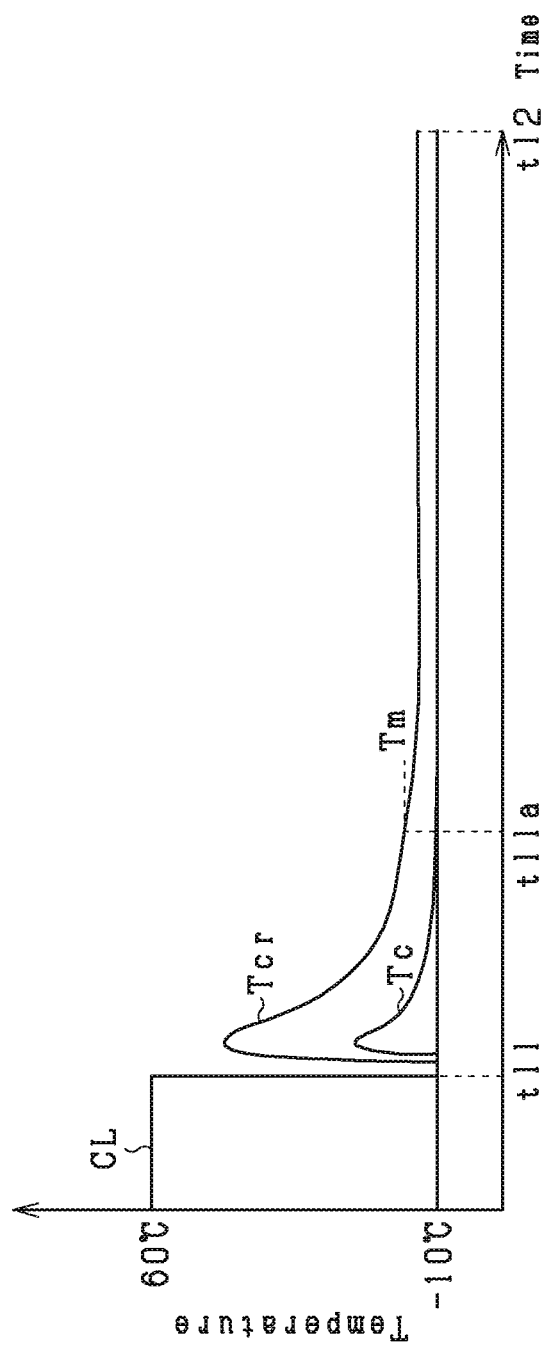
FIG. 4 is a time chart illustrating temperature Tcr of the heat medium that is returned to the second chiller and temperature Tc of the heat medium that is pumped out of the second chiller at the switching of the state from the first state to the second state.

FIG. 4 is a time chart illustrating temperature Tcr of the heat medium that returns to the second chiller 40 and temperature Tc of the heat medium that is pumped out of the second chiller 40 when the state is switched from the first state to the second state. Here, it is assumed that the temperature control system 100 does not include the tanks 32h and 52c, the tank bypass channels 34 and 54, and the mixing valves PVh and PVc.

At time t11, the state is switched from the first state to the second state. The temperature Tcr of the heat medium is the same as the temperature Tcr illustrated in FIG. 3. If the temperature Tcr of the heat medium that flows into the second chiller 40 is too high, the second chiller 40 is not able to properly adjust the temperature of the heat medium that is to be pumped out of the second chiller 40 to −10 [° C.]. Therefore, the temperature Tc of the heat medium that is pumped out of the second chiller 40 is higher than −10 [° C.] in a period from time t11 to time t11a. When the temperature Tcr of the heat medium that returns to the second chiller 40 decreases to a temperature Tm, the temperature Tc of the heat medium that is pumped out of the second chiller 40 reaches −10 [° C.]. That is, the second chiller 40 cannot adjust the temperature Tc of the heat medium that is pumped out of the second chiller 40 to the target temperature (−10 [° C.]) until the temperature Tcr of the heat medium that returns to the second chiller 40 decreases to the temperature Tm.

First Embodiment

In a first embodiment, when the state is switched from the first state to the second state, controls are executed to gradually release the heat medium that has been returned from the exchange section at the temperature higher than −10 [° C.] and temporally held in the second tank 52c. Similarly, when the state is switched from the second state to the first state, controls are executed to gradually release the heat medium that has been returned from the exchange section at the temperature lower than 60 [° C.] and temporally held in the first tank 32h.

Figure 5:
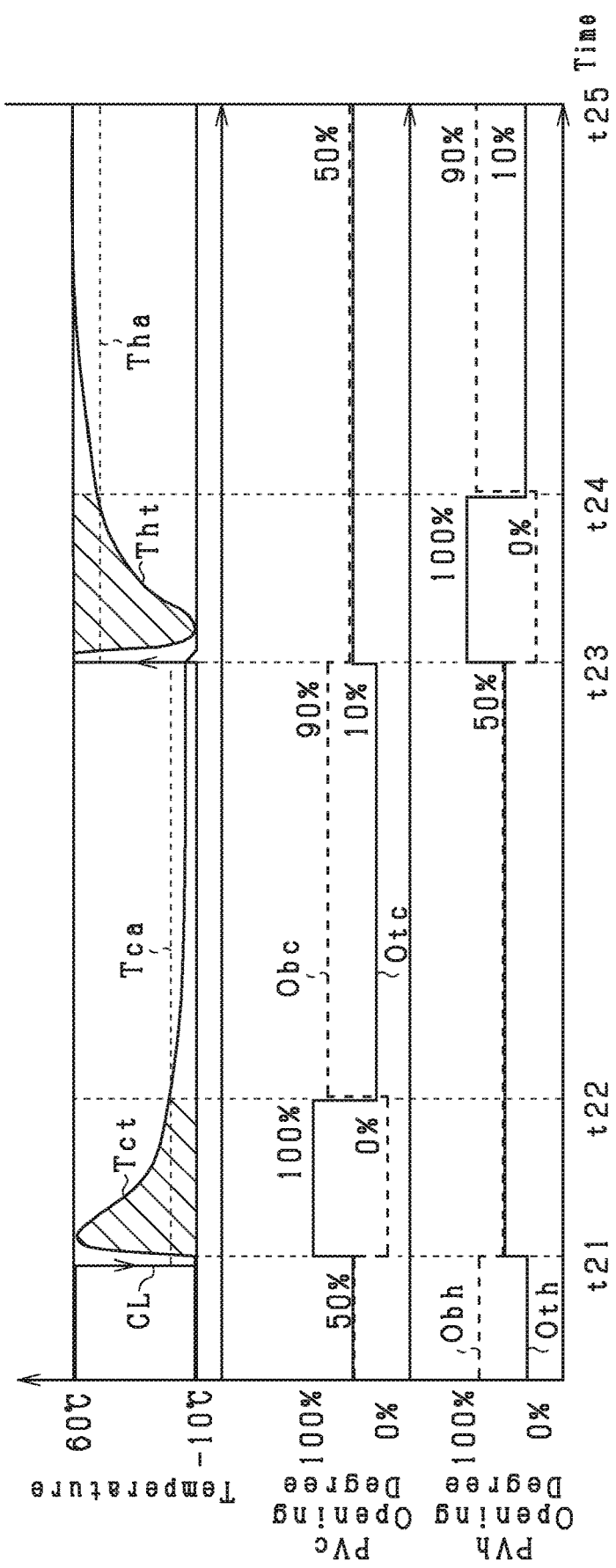
FIG. 5 is a time chart illustrating temperatures Tct and Tht of heat media that is returned to each tank, opening degree of a second mixing valve PVc, and opening degree of a first mixing valve PVh in a first embodiment.

FIG. 5 is a time chart illustrating temperatures Tct and Tht of the heat medium that is returned to each of the tanks 52c and 32h, opening degree of the second mixing valve PVc and opening degree of the first mixing valve PVh in the first embodiment.

In the first state up to time t21, the controller 70 controls the first supply valve Vh1, the first return valve Vh2, the first on-off valve Vh3, the second supply valve Vc1, the second return valve Vc2, and the second on-off valve Vc3 as described earlier. Through the controls, the heat medium at 60 [° C.] is supplied to the stage 10 and returned upstream of the first tank 32h and the heat medium at −10 [° C.] flows through the second target object bypass channel 53 to bypass the stage 10 and returns upstream of the second tank 52c while the flow of the heat medium from the stage 10 to the second tank 52c is blocked by the second return valve Vc2.

Further, the controller 70 controls the first mixing valve PVh to set its opening degree Oth on the first tank 32h side to 10 [%] and its opening degree Obh on the first tank bypass channel 34 side to 90 [%]. Through the controls, 90 [%] of the heat medium upstream of the first tank 32h flows into the first tank bypass channel 34, 10 [%] of the heat medium flows into the first tank 32h, and they join together at the first mixing valve PVh. Namely, the controller 70 controls the first mixing valve PVh to allow a flow of the heat medium from the first tank 32h into the first chiller 20 and to allow a flow of the heat medium from the first tank bypass channel 34 into the first chiller 20. Note that the controller 70 may control the first mixing valve PVh to set its opening degree Oth on the first tank 32h side to 20 [%] and its opening degree Obh on the first tank bypass channel 34 side to 80 [%]. In the subsequent control of the first mixing valve PVh, the opening degree may be set as appropriate.

Further, the controller 70 controls the second mixing valve PVc to set its opening degree Otc on the second tank 52c side to 50 [%] and its opening degree Obc on the second tank bypass channel 54 side to 50 [%]. Through the controls, 50 [%] of the heat medium upstream of the second tank 52c flows into the second tank 52c and 50 [%] of the heat medium flows into the second tank bypass channel 54, and they join together at the second mixing valve PVc. Namely, the controller 70 controls the second mixing valve PVc to allow a flow of the heat medium from the second tank 52c into the second chiller 40 and to allow a flow of the heat medium from the second tank bypass channel 54 into the second chiller 40. Note that the controller 70 may control the second mixing valve PVc to set its opening degree Otc on the second tank 52c side to 40 [%] and its opening degree Obc on the second tank bypass channel 54 side to 60 [%]. In the subsequent control of the second mixing valve PVc, the opening degree may be set as appropriate.

At time t21, the controller 70 executes controls to switch the state from the first state to the second state. In the second state, the controller 70 controls the first supply valve Vhf, the first return valve Vh2, the first on-off valve Vh3, the second supply valve Vc1, the second return valve Vc2, and the second on-off valve Vc3 as described earlier. Through the controls, the heat medium at 60 [° C.] flows through the first target object bypass channel 33 to bypass the stage 10 and returns upstream of the first tank 32h, the flow of the heat medium from the stage 10 to the first tank 32h is blocked, and the heat medium at −10 [° C.] is supplied to the stage 10 and returned upstream of the second tank 52c.

Further, the controller 70 controls the first mixing valve PVh to set its opening degree Oth on the first tank 32h side to 50 [%] and its opening degree Obh on the first tank bypass channel 34 side to 50 [%]. Through the control, 50 [%] of the heat medium that flows upstream of the first tank 32h via the first target object bypass channel 33 flows into the first tank bypass channel 34, 50 [%] of the heat medium flows into the first tank 32h, and they join together at the first mixing valve PVh. Namely, the controller 70 controls the first mixing valve PVh to allow the flow of the heat medium from the first tank 32h into the first chiller 20 and to allow the flow of the heat medium from the first tank bypass channel 34 into the first chiller 20.

Further, the controller 70 controls the second mixing valve PVc to set its opening degree Otc on the second tank 52c side to 100 [%] and its opening degree Obc on the second tank bypass channel 54 side to 0 [%]. Through the control, 100 [%] of the heat medium upstream of the send tank 52c flows into the second tank 52c, 0 [%] of the heat medium flows into the second tank bypass channel 54, and they join together at the second mixing valve PVc. Namely, the controller 70 starts control of the second mixing valve PVc to allow the flow of the heat medium from the second tank 52c into the second chiller 40 and to block the flow of the heat medium from the second tank bypass channel 54 to the second chiller 40.

At time t22, the controller 70 controls the second mixing valve PVc to set its opening degree Otc on the second tank 52c side to 10 [%] and its opening degree Obc on the second tank bypass channel 54 side to 90 [%]. Through the control, 10 [%] of the heat medium upstream of the send tank 52c flows into the second tank 52c, 90 [%] of the heat medium flows into the second tank bypass channel 54, and they join together at the second mixing valve PVc. Namely, the controller 70 controls the second mixing valve PVc to allow the flow of the heat medium from the second tank 52c into the second chiller 40 in an amount less than the amount of the heat medium that flows from the second tank bypass channel 54 into the second chiller 40.

Here, time t22 is the time at which the temperature Tct of the heat medium that has returned to the second tank 52c reaches an average temperature Tca, which is an average of temperatures Tct of the heat medium in a period from t21 to t23. Note that the average temperature Tca may be defined in advance based on a test. In this embodiment, the second fluid capacity MC, which is a capacity of the second tank 52c to hold the heat medium, is set to an amount of the heat medium that has returned to the second tank 52c in a period from time t21 to time t22. The second fluid capacity MC is a capacity defined by adding an amount of the fluid based on the heat capacity of the exchange section (at least the stage 10) to the fluid capacity of the exchange section (at least the stage 10). Namely, the controller 70 starts control of the second mixing valve PVc to allow the flow of the heat medium from the second tank 52c into the second chiller 40 in the amount less than the amount of the heat medium that flows from the second tank bypass channel 54 into the second chiller 40 when the amount of the heat medium that has flowed into the second tank 52c since the switching of the state from the first state to the second state reaches the second fluid capacity MC.

At time t23, the controller 70 executes controls to switch the state from the second state to the first state. In the first state, the controller 70 controls the first supply valve Vh1, the first return valve Vh2, the first on-off valve Vh3, the second supply valve Vc1, the second return valve Vc2, and the second on-off valve Vc3 as described earlier. Through the controls, the heat medium at 60 [° C.] is supplied to the stage 10 and returned upstream of the first tank 32h, the heat medium at −10 [° C.] flows through the second target object bypass channel 53 to bypass the stage 10 and returns upstream of the second tank 52c, and the flow of the heat medium from the stage 10 to the second tank 52c is blocked by the second return valve Vc2.

Further, the controller 70 controls the second mixing valve PVc to set its opening degree Otc on the second tank 52c side to 50 [%] and its opening degree Obs to 50 [%]. Through the control, 50 [%] of the heat medium that flows upstream of the second tank 52c via the second tank bypass channel 54 flows into the second tank bypass channel 54, 50 [%] of the heat medium flows into the second tank 52c, and they join together at the second mixing valve PVc. Namely, the controller 70 controls the second mixing valve PVc to allow the flow of the heat medium from the second tank 52c into the second chiller 40 and to allow the flow of the heat medium from the second tank bypass channel 54 into the second chiller 40.

Further, the controller 70 controls the first mixing valve PVh to set it opening degree Oth on the first tank 32h side to 100 [%] and the opening degree Obh on the first tank bypass channel 34 side to 0 [%]. Through the control, 100 [%] of the heat medium upstream of the first tank 32h flows into the first tank 32h, 0 [%] of the heat medium flows into the first tank bypass channel 34, and they join together at the first mixing valve PVh. Namely, when the state is switched from the second state to the first state, the controller 70 starts the control of the first mixing valve PVh to allow the flow of the heat medium from the first tank 32h into the first chiller 20 and to block the flow of the heat medium from the first tank bypass channel 34 into the first chiller 40.

At time t24, the controller 70 controls the first mixing valve PVh to set its opening degree Oth on the first tank 32h side to 10 [%] and its opening degree Obn on the first tank bypass channel 34 side to 90 [%]. Through the control, 10 [%] of the heat medium upstream of the first tank 32h flows into the first tank 32h, 90 [%] of the heat medium flows into the first tank bypass channel 34, and they join together at the first mixing valve PVh. Namely, the controller 70 controls the first mixing valve PVh to allow the flow of the heat medium from the first tank 32h into the first chiller 20 in an amount less than the amount of the heat medium that flows from the first tank bypass channel 34 into the first chiller 20.

Here, time t24 is the time at which the temperature Tht of the heat medium that has returned to the first tank 32h reaches an average temperature Tha, which is an average of temperatures Tht of the heat medium in a period from t23 to t25. Note that the average temperature Tha may be defined in advance based on a test. In this embodiment, the first fluid capacity MH, which is a capacity of the first tank 32h to hold the heat medium, is set to an amount of the heat medium that has returned to the first tank 32h in a period from time t23 to time t24. The first fluid capacity MH is a capacity defined by adding an amount of the fluid based on the heat capacity of the exchange section (at least the stage 10) to the fluid capacity of the exchange section (at least the stage 10). Namely, the controller 70 starts control of the first mixing valve PVh to allow the flow of the heat medium from the first tank 32h into the first chiller 20 in the amount less than the amount of the heat medium that flows from the first tank bypass channel 34 into the first chiller 20 when the amount of the heat medium that has flowed into the first tank 32h since the switching of the state from the second state to the first state reaches the first fluid capacity MH.

At time t25, the controller 70 executes controls similar to the controls that are executed at time t21, and then the controller 70 repeatedly executes the controls that are the same as the controls that are executed in a period from time t21 to time t25.

The embodiment described in detail above has the following advantages.

Through the controls of the first supply valve Vh1, the first return valve Vh2, and the first on-off valve Vh3 by the controller 70, the state can be switched between the state in which the heat medium at 60 [° C.] is supplied to the stage 10 and returned upstream of the first tank 32h and the state in which the heat medium at 60 [° C.] flows through the first target object bypass channel 33 to bypass the stage 10 and returns upstream of the first tank 32h. Similarly, through the controls of the second supply valve Vc1, the second return valve Vc2, and the second on-off valve Vc3 by the controller 70, the state can be switched between the state in which the heat medium at −10 [° C.] is supplied to the stage 10 and returned upstream of the second tank 52c and the state in which the heat medium at −10 [° C.] flows through the second target object bypass channel 53 to bypass the stage 10 and returns upstream of the second tank 52c.

The state can be switched between the first state and the second state. In the first state, the heat medium at 60 [° C.] is supplied to the stage 10 and returned upstream of the first tank 32h, the heat medium at −10 [° C.] flows through the second target object bypass channel 53 to bypass the stage 10 and returns upstream of the second tank 52c, and the flow of the heat medium from the stage 10 to the second tank 52c is blocked by the second return valve Vc2. In the second state, the heat medium at −10 [° C.] is supplied to the stage 10 and returned upstream of the second tank 52c, the heat medium at 60 [° C.] flows through the first target object bypass channel 33 to bypass the stage 10 and returns upstream of the first tank 32h, and the flow of the heat medium from the stage 10 to the first tank 32h is blocked by the first return valve Vh2. According to the configuration, the temperature of the stage 10 can be changed.

The second tank bypass channel 54 allows the heat medium to bypass the second tank 52c and to return downstream of the second tank 52c. The second mixing valve PVc adjusts the mixing ratio of the heat medium that flows from the second tank 52c into the second chiller 40 to the heat medium that flows from the second tank bypass channel 54 into the second chiller 40. After the switching of the state from the first state to the second stage, the flow of the heat medium from the second tank 52c into the second chiller 40 is allowed and the flow of the heat medium from the second tank bypass channel 54 to the second chiller 40 is blocked. According to the configuration, the heat medium at the temperature higher than −10 [° C.] is less likely to flow into the second chiller 40 and thus an increase in peak value of the power consumption of the second chiller 40 is less likely to occur. Further, while the heat in the amount corresponding to the heat capacity and the temperature of the stage 10 remains, the flow of the heat medium from the second tank 52c to the second chiller 40 is allowed and the flow of the heat medium from the second tank bypass channel 54 to the second chiller 40 is blocked. According to the configuration, the heat medium that is heated due to the heat that remains in the stage 10 is less likely to return to the second chiller 40. Therefore, the increase in peak value of power consumption of the second chiller 40 is further less likely to occur.

Then, the flow rate of the heat medium that flows from the second tank 52c into the second chiller 40 is reduced and the flow rate of the heat medium that flows from the second tank bypass channel 54 into the second chiller 40 is increased. According to the configuration, the heat medium at the temperature higher than −10 [° C.] gradually flows into the second chiller 40. Therefore, an increase in peak value of the power consumption of the second chiller 40 is less likely to occur when the heat medium at the temperature higher than −10 [° C.] is released from the second tank 52c. Similarly, an increase in peak value of the power consumption of the first chiller 20 is less likely to occur when the state is switched from the second state to the first state.

In the first state, the controller 70 controls the first mixing valve PVh to allow the flow of the heat medium from the first tank 32h into the first chiller 20 and to allow the flow of the heat medium from the first tank bypass channel 34 into the first chiller 20 and controls the second mixing valve PVc to allow the flow of the heat medium from the second tank 52c into the second chiller 40 and to allow the flow of the heat medium from the second tank bypass channel 54 into the second chiller 40. According to the configuration, in the first state, the heat medium at 60 [° C.] is held in the first tank 32h and the temperature of the first tank bypass channel 34 is less likely to deviate from 60 [° C.]. Further, in the first state, the heat medium at −10 [° C.] is held in the second tank 52 and the temperature of the second tank bypass channel 54 is less likely to deviate from −10 [° C.].

When the state is switched from the first state to the second state, the controller 70 starts the control of the second mixing valve PVc to allow the flow of the heat medium from the second tank 52c into the second chiller 40 and to block the flow of the heat medium from the second tank bypass channel 54 into the second chiller 40. According to the configuration, the heat medium at the temperature higher than −10 [° C.] is less likely to flow into the second chiller 40 and thus an increase in peak value of the power consumption of the second chiller 40 is less likely to occur.

The second fluid capacity MC is the capacity defined by adding the amount of the heat medium based on the heat capacity of the exchange section (at least the stage 10) to the fluid capacity of the exchange section (at least the stage 10).

The controller 70 maintains the state of the second mixing valve PVc until the amount of the heat medium that has flowed into the second tank 52c since the switching of the state from the first state to the second state reaches the second fluid capacity MC. According to the configuration, the heat medium that is heated due to the heat that remains in the exchange section is less likely to return to the second chiller 40 after the amount of the heat medium that has flowed into the second tank 52c reaches the amount corresponding to the fluid capacity of the exchange section. Therefore, an increase in peak value of the power consumption of the second chiller 40 is less likely to occur. Then, the controller 70 starts the control of the second mixing valve PVc to allow the flow of the heat medium from the second tank 52c into the second chiller 40 in the amount less than the amount of the heat medium that flows from the second tank bypass channel 54 into the second chiller 40. According to the configuration, an increase in peak value of the power consumption of the second chiller 40 is less likely to occur when the heat medium at the temperature higher than −10 [° C.] is released from the second tank 52c.

The second fluid capacity MC is predefined such that the second tank 52c is filled with the heat medium at the temperature higher than −10 [° C.] when the temperature Tct of the heat medium that has returned to the second tank 52c reaches the average temperature Tca at the switching of the state from the first state to the second state. Therefore, the heat medium is held in the second tank 52c while the temperature Tct of the heat medium that has returned to the second tank 52c is higher than the average temperature Tca, and the heat medium is released from the second tank 52c when the temperature Tct of the heat medium that decreases and reaches the average temperature Tca. Therefore, an increase in peak value of the power consumption of the second chiller 40 is less likely to occur and the second fluid capacity MC of the second tank 52c is less likely to become excessively large. Similarly, an increase in peak value of the power consumption of the first chiller 20 is less likely to occur and the first fluid capacity MH of the first tank 32h is less likely to become excessively large.

Because the temperature of the heat medium that flows into the second chiller 40 is less likely to be high when the state is switched from the first state to the second state, the second chiller 40 can easily adjust the temperature of the heat medium that is to be pumped out to −10 [° C.].

The advantages of the low temperature circulation supply system described above can be achieved by the high temperature circulation supply system.

The controller 70 controls the balancing valve 29 to open the balancing flow channel 28 in response to determination that an absolute value of a difference between the fluid level of the heat medium detected by the fluid level sensor 22 (the amount of the heat medium in the tank 21) and the fluid level of the heat medium detected by the fluid level sensor 42 (the amount of the heat medium in the tank 41) is greater than the predefined value. By supplying the heat medium to the stage 10 alternately from the first chiller 20 and the second chiller 40, the flow of the heat medium between the tank 21 and the tank 41 is less likely to occur while the absolute value of the difference between the amount of the heat medium in the tank 21 and the amount of the heat medium in the tank 41 is maintained less than the predefined value. Therefore, heat losses of the chillers 20 and 40 can be reduced and thus the power consumption of the chillers 20 and 40 can be reduced. If the absolute value of the difference between the amount of the heat medium in the tank 21 and the amount of the heat medium in the tank 41 becomes greater than the predefined value for some reasons, the amount of the heat medium in the tank 21 and the amount of the heat medium in the tank 41 can be balanced.

Note that the first embodiment can be modified and implemented as follows. The same components and sections as those in the first embodiment are identified with the same reference signs and will not be described.

At time t21 in FIG. 5, the controller 70 controls the second mixing valve PVc to set it opening degree Otc on the second tank 52c side to 90 [%] and the opening degree Obc on the second tank bypass channel 54 side to 10 [%]. Through the controls, 90 [%] of the heat medium upstream of the second tank 52c flows into the second tank 52c, 10 [%] of the heat medium flows into the second tank bypass channel 54, and they join together at the second mixing valve PVc. Namely, when the state is switched from the first state to the second state, the controller 70 starts the control of the second mixing valve PVc to allow the flow of the heat medium from the second tank bypass channel 54 into the second chiller 40 in the amount less than the amount of the heat medium that flows from the second tank 52c into the second chiller 40. According to the configuration, the heat medium at the temperature higher than −10 [° C.] is less likely to flow into the second chiller 40 and thus an increase in peak value of the power consumption of the second chiller 40 is less likely to occur.

Similarly, at time t23 in FIG. 5, the controller 70 controls the first mixing valve PVh to set its opening degree Oth on the first tank 32h side to 90 [%] and its opening degree Obh on the first tank bypass channel 34 side to 10 [%]. Namely, when the state is switched from the second state to the first state, the controller 70 starts the control of the first mixing valve PVh to allow the flow of the heat medium from the first tank bypass channel 34 into the first chiller 20 in the amount less than the amount of the heat medium that flows from the first tank 32h into the first chiller 20. According to the configuration, the heat medium at the temperature lower than 60 [° C.] is less likely to flow into the first chiller 20 and thus an increase in peak value of the power consumption of the first chiller 20 is less likely to occur.

Second Embodiment

A second embodiment will be described with a focus on differences between the first embodiment and the second embodiment.

In the second embodiment, when the state is switched from the first state to the second state and the return of the heat medium at about 60 [° C.] from the exchange section to the first chiller 20 is completed, controls are executed to gradually release the heat medium that has been returned from the exchange section at the temperature higher than −10 [° C.] and temporally held in the second tank 52c. Similarly, when the state is switched from the second state to the first state and the return of the heat medium at about −10 [° C.] from the exchange section to the second chiller 40 is completed, controls are executed to gradually release the heat medium that has been returned from the exchange section at the temperature lower than 60 [° C.] and temporally held in the first tank 32h.

Figure 6:
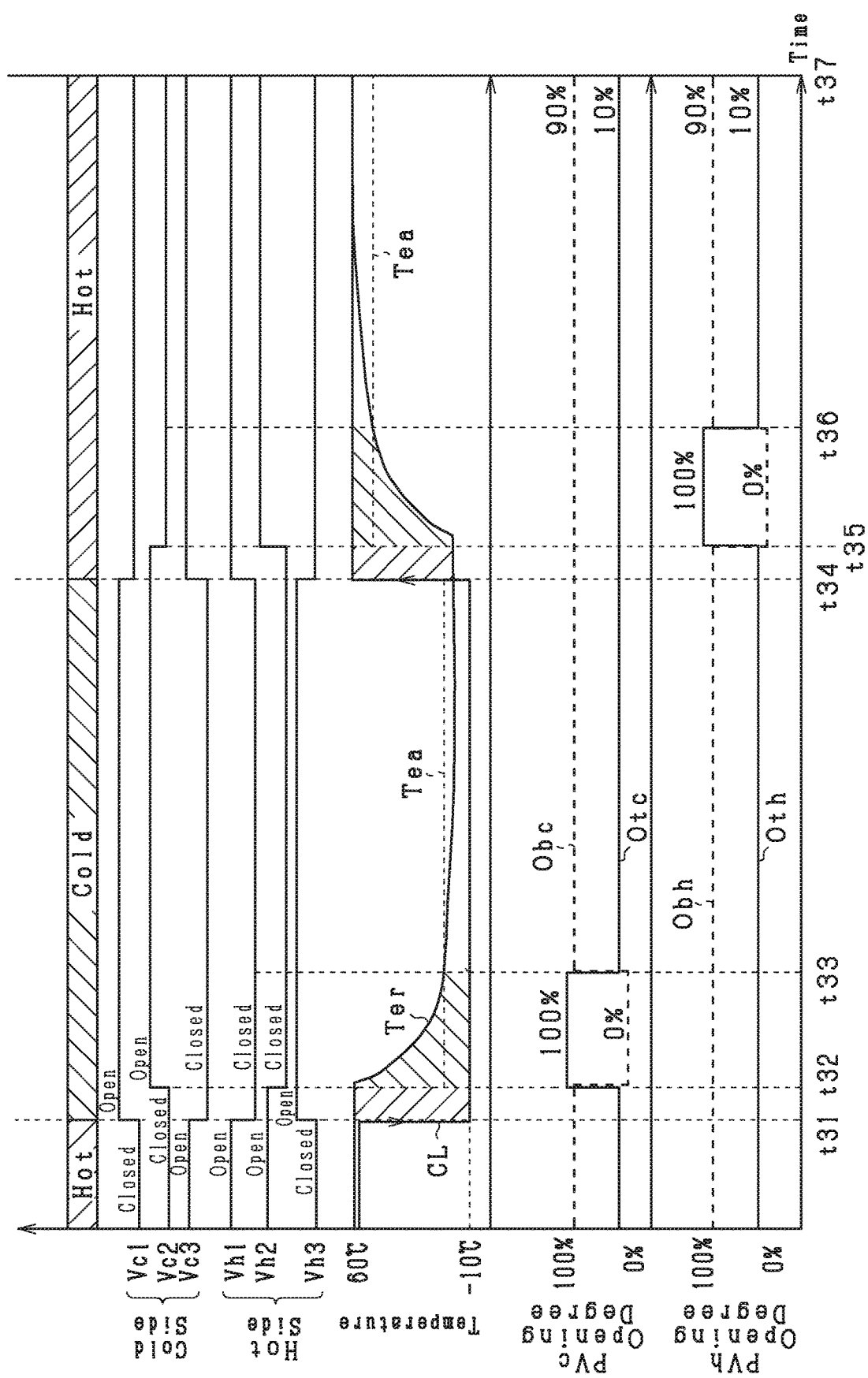
FIG. 6 is a time chart illustrating on and off states of each valve, temperature Ter of the heat medium that is returned from a stage, opening degree of the second mixing valve PVc, and opening degree of the first mixing valve PVh in a second embodiment.

FIG. 6 is a time chart illustrating open and closed states of each valve, temperature Ter of the heat medium that returns from the stage 10, opening degree of the second mixing valve PVc, and opening degree of the first mixing valve PVh in the second embodiment.

In the first state until time t31, the controller 70 controls the first supply valve Vh1, the first return valve Vh2, the first on-off valve Vh3, the second supply valve Vc1, the second return valve Vc2, and the second on-off valve Vc3 as described earlier. Further, the controller 70 controls the first mixing valve PVh to set its opening degree Oth on the first tank 32h side to 10 [%] and its opening degree Obh on the first tank bypass channel 34 to 90 [%].

Further, the controller 70 controls the second mixing valve PVc to set its opening degree Otc on the second tank 52c side to 10 [%] and its opening degree Obc on the second tank bypass channel 54 to 90 [%]. Through the controls, 10 [%] of the heat medium upstream of the second tank 52c flows into the second tank 52c and 90 [%] of the heat medium flows into the second tank bypass channel 54, and they join together at the second mixing valve PVc. Namely, the controller 70 controls the second mixing valve PVc to allow the flow of the heat medium from the second tank 52c into the second chiller 40 and to allow the flow of the heat medium from the second tank bypass channel 54 into the second chiller 40.

At time t31, the controller 70 controls the first supply valve Vh1 to block the flow of the heat medium from the first chiller 20 to the stage 10 and to open the first target object bypass channel 33, controls the second supply valve Vc1 to supply the heat medium from the second chiller 40 to the stage 10, and controls the second on-off valve Vc3 to close the second target object bypass channel 53.

At time t32, the controller 70 controls the first return valve Vh2 to block the flow of the heat medium from the stage 10 to the first tank 32h and controls the second return valve Vc2 to return the heat medium from the stage 10 to the second tank 52c. Through the controls, the state is switched to the second state. Further, the controller 70 controls the second mixing valve PVc to set its opening degree Otc on the second tank 52c side to 100 [%] and its opening degree Obc on the second tank bypass channel 54 side to 0 [%]. Namely, when the state is switched to the second state, the controller 70 starts control of the second mixing valve PVc to allow the flow of the heat medium from the second tank 52c into the second chiller 40 and to block the flow of the heat medium from the second tank bypass channel 54 into the second chiller 40.

Here, time t32 is the time at which the amount of the heat medium that has flowed from the exchange section since time t31 reaches the fluid capacity of the exchange section. Namely, the controller 70 switches the state to the second state when the amount of the heat medium that has flowed into the first chiller 20 since time t31, at which the controller 70 controls the first supply valve Vh1, the first on-off valve Vh3, the second supply valve Vc1, and the second on-off valve Vc3 reaches the fluid capacity of the exchange section (at least the stage 10).

At time t33, the controller 70 controls the second mixing valve PVc to set its opening degree Otc on the second tank 52c side to 10 [%] and its opening degree Obc on the second tank bypass channel 54 side to 90 [%].

Here, time t33 is the time at which the temperature Ter of the heat medium that has returned from the stage 10 reaches the average temperature Tea that is an average of temperatures Ter of the heat medium in a period from time t32 to time t34. Note that the average temperature Tea may be defined in advance based on a test. In this embodiment, the second fluid capacity MC, which is the capacity of the second tank 52c to hold the heat medium, is set equal to the amount of the heat medium that has returned to the second tank 52c in a period from time t32 to time t33. The second fluid capacity MC is the capacity that is defined based on the heat capacity of the exchange section (at least the stage 10).

Namely, the controller 70 starts the control of the second mixing valve PVc to allow the flow of the heat medium from the second tank 52c into the second chiller 40 in the amount less than the amount of the heat medium that flows from the second tank 52c into the second chiller 40 when the amount of the heat medium that has flowed into the second tank 52c since the switching of the state to the second state reaches the second fluid capacity MC.

At time t34, the controller 70 controls the first supply valve Vh1 to supply the heat medium from the first chiller 20 to the stage 10, controls the first on-off valve Vh3 to close the first target object bypass channel 33, controls the second supply valve Vc1 to block the flow of the heat medium from the second chiller 40 to the stage 10, and controls the second on-off valve Vc3 to open the second target object bypass channel 53.

At time t35, the controller 70 controls the first return valve Vh2 to return the heat medium from the stage 10 to the first tank 32h and controls the second return valve Vc2 to block the flow of the meat medium from the stage 10 to the second tank 52c. Through the controls, the state is switched to the first state. Further, the controller 70 controls the first mixing valve PVh to set its opening degree Oth on the first tank 32h side to 100 [%] and its opening degree Obh on the first tank bypass channel 34 side to 0 [%]. Namely, when the state is switched to the first state, the controller 70 starts control of the first mixing valve PVh to allow the flow of the heat medium from the first tank 32h into the first chiller 20 and to block the flow of the heat medium from the first tank bypass channel 34 into the first chiller 20.

Here, time t35 is the time at which the amount of the heat medium that has flowed from the exchange section reaches the fluid capacity of the exchange section. Namely, the controller 70 switches the state to the first state when the amount of the heat medium that has flowed into the second chiller 40 since time t34 at which the controller 70 controls the first supply valve Vh1, the first on-off valve Vh3, the second supply valve Vc1, and the second on-off valve Vc3 reaches the fluid capacity of the exchange section (at least the stage 10).

At time t36, the controller 70 controls the first mixing valve PVh to set its opening degree Oth on the first tank 32h side to 10 [%] and its opening degree Obh on the first tank bypass channel 34 side to 90 [%].

Here, time t36 is the time at which the temperature Ter of the heat medium that has returned from the stage 10 reaches the average temperature Tea that is an average of temperatures Ter of the heat medium in a period from time t35 to time t37. Note that the average temperature Tea may be defined in advance based on a test. In this embodiment, the first fluid capacity MH, which is the capacity of the first tank 32h to hold the heat medium, is set to an amount of the heat medium that has returned to the first tank 32h in a period from time t35 to time t36. The first fluid capacity MH is defined based on the heat capacity of the exchange section (at least the stage 10). Namely, the controller 70 starts control of the first mixing valve PVh to allow the flow of the heat medium from the first tank 32h into the first chiller 20 in the amount less than the amount of the heat medium that flows from the first tank bypass channel 34 into the first chiller 20 when the amount of the heat medium that has flowed into the first tank 32h since the switching of the state from the second state to the first state reaches the first fluid capacity MH.

At time t37, the controller 70 executes controls similar to the controls that are executed at time t31 and then the controller 70 repeatedly executes the controls that are the same as the controls that are executed in a period from time t31 to time t37.

The embodiment described in detail above has the following advantages. Note that only advantages different from the advantages of the first embodiment will be described in this section and subsequent sections.

From the first state, the controller 70 controls the first supply valve Vhf to block the flow of the heat medium from the first chiller 20 to the stage 10 and controls the second supply valve Vc1 to supply the heat medium from the second chiller 40 to the stage 10. Through the controls, when the state is switched from the state in which the heat medium at 60 [° C.] is supplied from the first chiller 20 to the stage 10 to the state in which the heat medium at −10 [° C.] is supplied from the second chiller 40 to the stage 10, the heat medium at 60 [° C.] is less likely to flow into the second chiller 40. The controller 70 switches the state to the second state when the amount of the heat medium that has flowed into the first chiller 20 since then reaches the fluid capacity of the exchange section (at least the stage 10). According to the configuration, the heat medium in the amount corresponding to the heat medium capacity of the exchange section is less likely to flow into the second chiller 40 and thus an increase in peak value of the power consumption of the second chiller 40 is less likely to occur.

The second fluid capacity MC is defined based on the heat capacity of the exchange section (at least the stage 10). Upon the switching of the state to the second state, the controller 70 starts the control of the second mixing valve PVc to allow the flow of the heat medium from the second tank 52c into the second chiller 40 and to block the flow of the heat medium from the second tank bypass channel 54 into the second chiller 40. Through the controls, the heat medium that is heated due to the heat that remains in the exchange section (at least the stage 10) after the heat medium in the amount corresponding to the fluid capacity of the exchange section has flowed into the first chiller 20 is less likely to return to the second chiller 40. According to the configuration, the increase in peak value of the power consumption of the second chiller 40 is further less likely to occur. Then, the controller 70 starts the control of the second mixing valve PVc to allow the flow of the heat medium from the second tank 52c into the second chiller 40 in the amount less than the amount of the heat medium that flows from the second tank bypass channel 54 to the second chiller 40 when the amount of the heat medium that has flowed into the second tank 52c since the switching of the state to the second state reaches the second fluid capacity MC. According to the configuration, an increase in peak value of the power consumption of the second chiller 40 is less likely to occur when the heat medium at the temperature higher than −10 [° C.] in the second tank 52c is released.

Because the flow of the heat medium into the second tank 52c is allowed after the amount of the heat medium that has flowed into the first chiller 20 reaches the amount corresponding to the fluid capacity of the exchange section, the second fluid capacity MC of the second tank 52c can be reduced in comparison to that of the first embodiment.

The advantages achieved by the low temperature circulation supply system described above can be achieved by the high temperature circulation supply system in the same manner.

Note that the second embodiment can also be modified and implemented as follows. The same components and sections as those in the second embodiment are identified with the same reference signs and will not be described.

At time t32 in FIG. 6, the controller 70 controls the second mixing valve PVc to set its opening degree Otc on the second tank 52c side to 90 [%] and its opening degree Obc on the second tank bypass channel 54 side to 10 [%]. Namely, when the state is switched to the second state, the controller 70 starts the control of the second mixing valve PVc to allow the flow of the heat medium from the second tank bypass channel 54 into the second chiller 40 in the amount less than the amount of the heat medium that flows from the second tank 52c into the second chiller 40. According to the configuration, the heat medium at the temperature higher than −10 [° C.] is less likely to flow into the second chiller 40 and thus an increase in peak value of the power consumption of the second chiller 40 is less likely to occur.

Similarly, at time t35 in FIG. 6, the controller 70 controls the first mixing valve PVh to set its opening degree Oth on the first tank 32h side to 90 [%] and its opening degree Obh on the first tank bypass channel 34 side to 10 [%]. Namely, when the state is switched to the first state, the controller 70 starts control of the first mixing valve PVh to allow the flow of the heat medium from the first tank bypass channel 34 into the first chiller 20 in the amount less than the amount of the heat medium that flows from the first tank 32h into the first chiller 20. According to the configuration, the heat medium at the temperature lower than 60 [° C.] is less likely to flow into the first chiller 20 and thus an increase in peak value of the power consumption of the first chiller 20 is less likely to occur.

Third Embodiment

A third embodiment will be described with a focus on differences between the second embodiment and the third embodiment.

In the third embodiment, when the state is switched from the first state to the second state and the return of the heat medium at about 60 [° C.] from the exchange section to the first chiller 20 is completed, controls are executed to gradually release the heat medium that has been returned from the exchange section at the temperature lower than 60 [° C.] and temporally held in the first tank 32h and then to gradually release the heat medium that has been returned from the exchange section at the temperature higher than −10 [° C.] and temporally held in the second tank 52c. Similarly, when the state is switched from the second state to the first state and the return of the heat medium at about −10 [° C.] from the exchange section to the second chiller 40 is completed, controls are executed to gradually release the heat medium that has been returned from the exchange section at the temperature higher than −10 [° C.] and temporally held in the second tank 52c and then to gradually release the heat medium that has been returned from the exchange section at the temperature lower than 60 [° C.] and temporally held in the first tank 32h.

Figure 7:
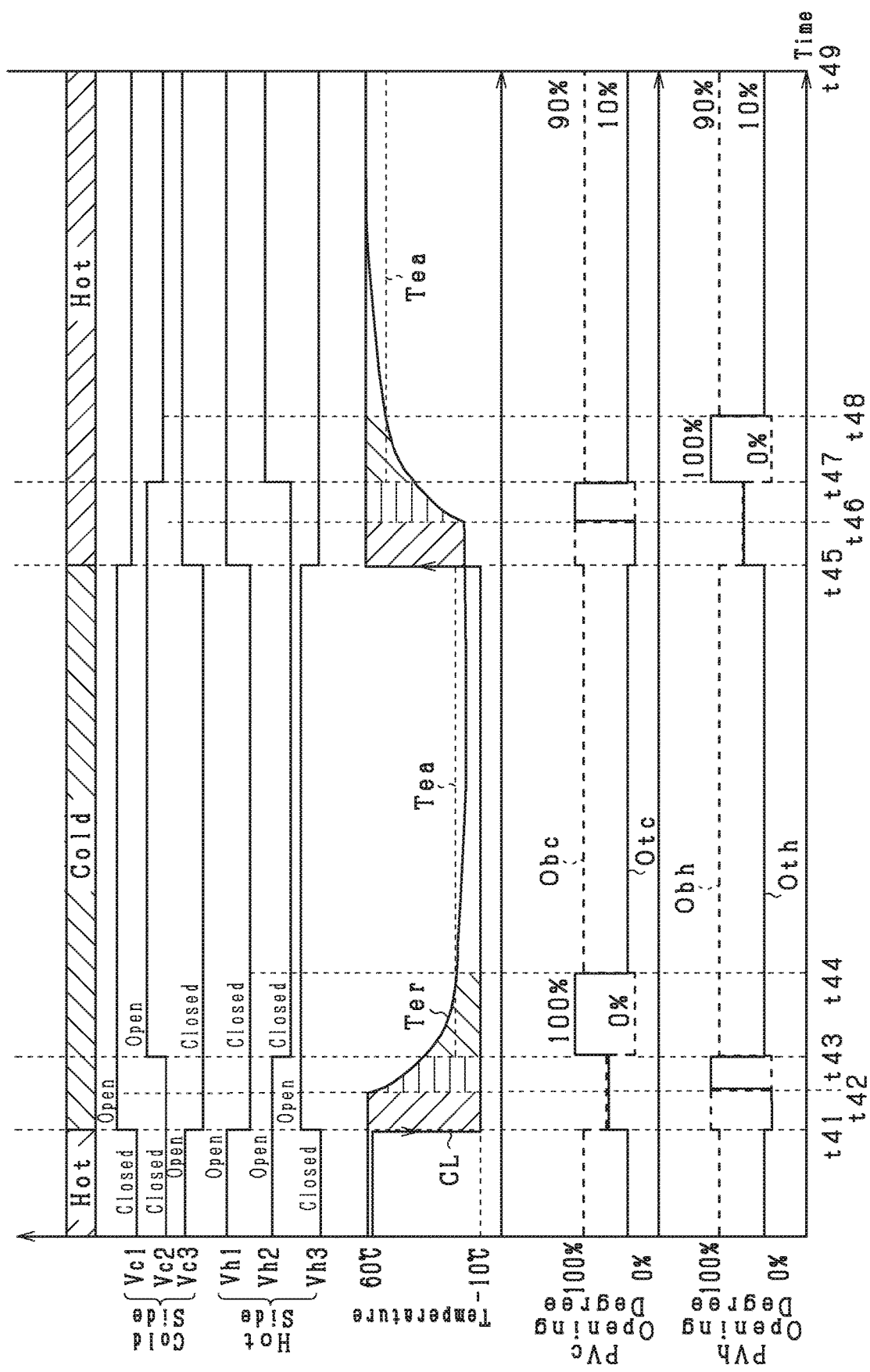
FIG. 7 is a time chart illustrating on and off states of each valve, temperature Ter of the heat medium that is returned from a stage, opening degree of the second mixing valve PVc, and opening degree of the first mixing valve PVh in a third embodiment.

FIG. 7 is a time chart illustrating open and closed states of each valve, temperature Ter of the heat medium that returns from the stage 10, opening degree of the second mixing valve PVc, and opening degree of the first mixing valve PVh in the third embodiment.

In the first state until time t41, the controller 70 controls the first supply valve Vh1, the first return valve Vh2, the first on-off valve Vh3, the second supply valve Vc1, the second return valve Vc2, and the second on-off valve Vc3 as described earlier. Further, the controller 70 controls the first mixing valve PVh to set its opening degree Oth on the first tank 32h side to 10 [%] and its opening degree Obh on the first tank bypass channel 34 side to 90 [%]. Further, the controller 70 controls the second mixing valve PVc to set its opening degree Otc on the second tank 52c side to 10 [%] and its opening degree Obc on the second tank bypass channel 54 side to 90 [%].

At time t41, the controller 70 controls the first supply valve Vh1 to block the flow of the heat medium from the first chiller 20 to the stage 10, controls the first on-off valve Vh3 to open the first target object bypass channel 33, controls the second supply valve Vc1 to supply the heat medium from the second chiller 40 to the stage 10, and controls the second on-off valve Vc3 to close the second target object bypass channel 53.

Further, the controller 70 controls the first mixing valve PVh to set its opening degree Oth on the first tank 32h side to 0 [%] and its opening degree Obh on the first tank bypass channel 34 side to 100 [%]. Namely, the controller 70 controls the first mixing valve PVh to block the flow of the heat medium from the first tank 32h into the first chiller 20 and to allow the flow of the heat medium from the first tank bypass channel 34 into the first chiller 20. Further, the controller 70 controls the second mixing valve PVc to set its opening degree Otc on the second tank 52c side to 50 [%] and its opening degree Obc on the second tank bypass channel 54 side to 50 [%].

At time t42, the controller 70 controls the first mixing valve PVh to set its opening degree Oth on the first tank 32h side to 100 [%] and its opening degree Obh on the first tank bypass channel 34 side to 0 [%]. Namely, the controller 70 controls the first mixing valve PVh to allow the flow of the heat medium from the first tank 32h into the first chiller 20 and to block the flow of the heat medium from the first tank bypass channel 34 into the first chiller 20 when the amount of the heat medium that has flowed into the first chiller 20 since time t41 at which the controller 70 controls the first supply valve Vh1, the first on-off valve Vh3, the second supply valve Vc1, and the second on-off valve Vc3 reaches the fluid capacity of the exchange section (at least the stage 10).

At time t43, the controller 70 controls the first return valve Vh2 to block the flow of the heat medium from the stage 10 to the first tank 32h and controls the second return valve 52c to return the heat medium from the stage 10 to the second tank 52c. Through the controls, the state is switched to the second state. Further, the controller 70 controls the first mixing valve PVh to set its opening degree Oth on the first tank 32h side to 10 [%] and its opening degree Obh on the first tank bypass channel 34 side to 90 [%]. Namely, the controller 70 controls the first mixing valve PVh to allow the flow of the heat medium from the first tank 32h into the first chiller 20 in the amount less than the amount of the heat medium that flows from the first tank bypass channel 34 into the first chiller 20.

Further, the controller 70 controls the second mixing valve PVc to set its opening degree Otc on the second tank 52c side to 100 [%] and its opening degree Obc on the second tank bypass channel 54 side to 0 [%].

Here, time t43 is the time at which the temperature Ter of the heat medium that has returned from the stage 10 reaches 25 [° C.] (an intermediate temperature between the temperature of the heat medium suppled from the first chiller 20 and the temperature of the heat medium supplied from the second chiller 40). In this embodiment, the first fluid capacity MH, which is the capacity of the first tank 32h to hold the heat medium, is set to an amount of the heat medium that has returned to the first tank 32h in a period from time t42 to time t43. The first fluid capacity MH is defined based on the heat capacity of the exchange section (at least the stage 10).

Namely, the controller 70 starts control of the first mixing valve PVh to allow the flow of the heat medium from the first tank 32h into the first chiller 20 in the amount less than the amount of the heat medium that flows from the first tank bypass channel 34 into the first chiller 20 when the amount of the heat medium that has flowed into the first tank 32h since time t42 at which the first mixing valve PVh is controlled reaches the first fluid capacity MH, switches the state to the second state, and controls the second mixing valve PVc to allow the flow of the heat medium from the second tank 52c into the second chiller 40 and to block the flow of the heat medium from the second tank bypass channel 54 into the second chiller 40.

At time t44, the controller 70 controls the second mixing valve PVc to set its opening degree Otc on the second tank 52c side to 10 [%] and its opening degree Obc on the second tank bypass channel 54 side to 90 [%].

Here, time t44 is the time at which the temperature Ter of the heat medium that has returned from the stage 10 reaches an average temperature Tea, which is an average of temperatures Ter in a period from time t43 to time t45. Note that the average temperature Tea may be defined in advance based on a test. In this embodiment, the second fluid capacity MC, which is the capacity of the second tank 52c to hold the heat medium, is set to an amount of the heat medium that has returned to the second tank 52c in a period from time t43 to time t44. The second fluid capacity MC is defined based on the heat capacity of the exchange section (at least the stage 10) to the fluid capacity of the exchange section (at least the stage 10). Namely, the controller 70 starts control of the second mixing valve PVc to allow the flow of the heat medium from the second tank 52c into the second chiller 40 in the amount less than the amount of the heat medium that flows from the second tank bypass channel 54 into the second chiller 40 when the amount of the heat medium that has flowed into the second tank 52c since the switching of the state to the second state reaches the second fluid capacity MC.

At time t45, the controller 70 controls the first supply valve Vh1 to supply the heat medium from the first chiller to the stage 10, controls the first on-off valve Vh3 to close the first target object bypass channel 33, controls the second supply valve Vc1 to block the flow of the heat medium from the second chiller 40 to the stage 10, and controls the second on-off valve Vc3 to open the second target object bypass channel 53.

Further, the controller 70 controls the first mixing valve PVh to set its opening degree Oth on the first tank 32h side to 50 [%] and its opening degree Obh on the first tank bypass channel 34 side to 50 [%]. Further, the controller 70 controls the second mixing valve PVc to set its opening degree Otc on the second tank 52c side to 0 [%] and its opening degree Obc on the second tank bypass channel 54 side to 100 [%]. The controller 70 controls the second mixing valve PVc to block the flow of the heat medium from the second tank 52c into the second chiller 40 and to allow the flow of the heat medium from the second tank bypass channel 54 into the second chiller 40.

At time t46, the controller 70 controls the second mixing valve PVc to set its opening degree Otc on the second tank 52c side to 100 [%] and its opening degree Obc on the second tank bypass channel 54 side to 0 [%]. Namely, the controller 70 controls the second mixing valve PVc to allow the flow of the heat medium from the second tank 52c into the second chiller 40 and to block the flow of the heat medium from the second tank bypass channel 54 into the second chiller 40 when the amount of the heat medium that has flowed into the second tank 52c since time t45 at which the controller 70 controls the first supply valve Vhf, the first on-off valve Vh3, the second supply valve Vc1, and the second on-off valve Vc3 reaches the fluid capacity of the exchange section (at least the stage 10).

At time t47, the controller 70 controls the first return valve Vh2 to return the heat medium from the stage 10 to the first tank 32h, and controls the second return valve Vc2 to block the flow of the heat medium from the stage 10 to the second tank 52c. Through the controls, the state is switched to the first state. Further, the controller 70 controls the second mixing valve PVc to set its opening degree Otc on the second tank 52c side to 10 [%] and its opening degree Obc on the second tank bypass channel 54 side to 90 [%]. Namely, the controller 70 controls the second mixing valve PVc to allow the flow of the heat medium from the second tank 52c into the second chiller 40 in the amount less than the amount of the heat medium that flows from the second tank bypass channel 54 into the second chiller 40.

Further, the controller 70 controls the first mixing valve PVh to set its opening degree Oth on the first tank 32h side to 100 [%] and its opening degree Obh on the first tank bypass channel 34 side to 0 [%].

Here, time t47 is the time at which the temperature Ter of the heat medium that has returned from the stage 10 reaches 25 [° C.] (an intermediate temperature between the temperature of the heat medium suppled from the first chiller 20 and the temperature of the heat medium supplied from the second chiller 40). The second fluid capacity MC, which is the capacity of the second tank 52c to hold the heat medium, may be set equal to the amount of the heat medium that has returned to the second tank 52c in a period from time t46 to time t47. The second fluid capacity MC is defined based on the heat capacity of the exchange section (at least the stage 10). Namely, the controller 70 controls the second mixing valve PVc to allow the flow of the heat medium from the second tank 52c into the second chiller 40 in the amount less than the amount of the heat medium that flows from the second tank bypass channel 54 to the second chiller 40, switches the state to the first state, and controls the first mixing valve PVh to allow the flow of the heat medium from the first tank 32h into the first chiller 20 and to block the flow of the heat medium from the first tank bypass channel 34 into the first chiller 20 when the amount of the heat medium that has flowed into the second tank 52c since time t46 at which the second mixing valve PVc is controlled reaches the second fluid capacity MC.

At time t48, the controller 70 controls the first mixing valve PVh to set its opening degree Oth on the first tank 32h side to 10 [%] and its opening degree Obh on the first tank bypass channel 34 side to 90 [%].

Here, time t48 is the time at which the temperature Ter of the heat medium that has returned from the stage 10 reaches an average temperature Tea, which is an average of temperatures Ter of the heat medium in a period from t47 to t49. The average temperature Tea may be defined in advance based on a test. Note that the first fluid capacity MH, which is the capacity of the first tank 32h to hold the heat medium, may be set equal to the amount of the heat medium that has returned to the first tank 32h in a period from time t47 to time t48. The first fluid capacity MH is defined based on the heat capacity of the exchange section (at least the stage 10) to the fluid capacity of the exchange section (at least the stage 10). Namely, the controller 70 starts control of the first mixing valve PVh to allow the flow of the heat medium from the first tank 32h into the first chiller 20 in the amount less than the amount of the heat medium that flows from the first tank bypass channel 34 into the first chiller 20 when the amount of the heat medium that has flowed into the first tank 32h since the switching of the state to the first state reaches the first fluid capacity MH.

At time t49, the controller 70 executes controls similar to the controls that are executed at time t41 and then the controller 70 repeatedly executes the controls that are the same as the controls that are executed in a period from time t41 to time t49.

The embodiment described in detail above has the following advantages.

A difference from the second embodiment is that the heat medium that returns from the stage 10 at the temperature higher than −10 [° C.] is divided and held in the first tank 32h and the second tank 52c. Therefore, the temperature of the heat medium that flows from the first tank 32h into the first chiller 20 is less likely to deviate from 60 [° C.] and the temperature of the head medium that flows from the second tank 52c into the second chiller 40 is less likely to deviate from −10 [° C.]. According to the configuration, an increase in the total power consumption of the first chiller 20 and the second chiller 40 is less likely to occur.

Note that the third embodiment can also be modified and implemented as follows. The same components and sections as those in the third embodiment are identified with the same reference signs and will not be described.

At time t42 in FIG. 7, the controller 70 controls the first mixing valve PVh to set its opening degree Oth on the first tank 32h side to 90 [%] and its opening degree Obh on the first tank bypass channel 34 side to 10 [%]. Namely, the controller 70 starts control of the first mixing valve PVh to allow the flow of the heat medium from the first tank bypass channel 34 into the first chiller 20 in the amount less than the amount of the heat medium that flows from the first tank 32h into the first chiller 20 when the amount of the heat medium that has flowed into the first tank bypass channel 34 since time t41 at which the controller 70 controls the first supply valve Vh1, the first on-off valve Vh3, the second supply valve Vc1, and the second on-off valve Vc3 reaches the fluid capacity of the exchange section (at least the stage 10). According to the configuration, the heat medium at the temperature lower than 60 [° C.] is less likely to flow into the first chiller 20 and thus an increase in peak value of the power consumption of the first chiller 20 is less likely to occur.

At time t43, the controller 70 controls the second mixing valve PVc to set its opening degree Otc on the second tank 52c side to 90 [%] and its opening degree Obc on the second tank bypass channel 54 side to 10 [%]. Namely, when the state is switched to the second state the controller 70 starts the control of the second mixing valve PVc to allow the flow of the heat medium from the second tank bypass channel 54 into the second chiller 40 in the amount less than the amount of the heat medium that flows from the second tank 52c into the second chiller 40. According to the configuration, the heat medium at the temperature higher than −10 [° C.] is less likely to flow into the second chiller 40 and thus an increase in peak value of the power consumption of the second chiller 40 is less likely to occur.

Similarly, at time t46 in FIG. 7, the controller 70 controls the second mixing valve PVc to set its opening degree Otc on the second tank 52c side to 90 [%] and its opening degree Obc on the second tank bypass channel 54 side to 10 [%]. Namely, the controller 70 starts the control of the second mixing valve PVc to allow the flow of the heat medium from the second tank bypass channel 54 into the second chiller 40 in the amount less than the amount of the heat medium that flows from the second tank 52c into the second chiller 40 when the amount of the heat medium that has flowed into the second tank bypass channel 54 since time t45 at which the controller 70 controls the first supply valve Vh1, the first on-off valve Vh3, the second supply valve Vc1, and the second on-off valve Vc3 reaches the fluid capacity of the exchange section (at least the stage 10). According to the configuration, the heat medium at the temperature higher than −10 [° C.] is less likely to flow into the second chiller 40 and thus an increase in peak value of the power consumption of the second chiller 40 is less likely to occur.

At time t47, the controller 70 starts the control of the first mixing valve PVh to set its opening degree Oth on the first tank 32h side to 90 [%] and its opening degree Obh on the first tank bypass channel 34 side to 10 [%]. Namely, when upon the state is switched to the first state, the controller 70 starts the control of the first mixing valve PVh to allow the flow of the heat medium from the first tank bypass channel 34 into the first chiller 20 in the amount less than the amount of the heat medium that flows from the first tank 32h into the first chiller 20. According to the configuration, the heat medium at the temperature lower than 60 [° C.] is less likely to flow into the first chiller 20 and thus an increase in peak value of the power consumption of the first chiller 20 is less likely to occur.

Figure 8:
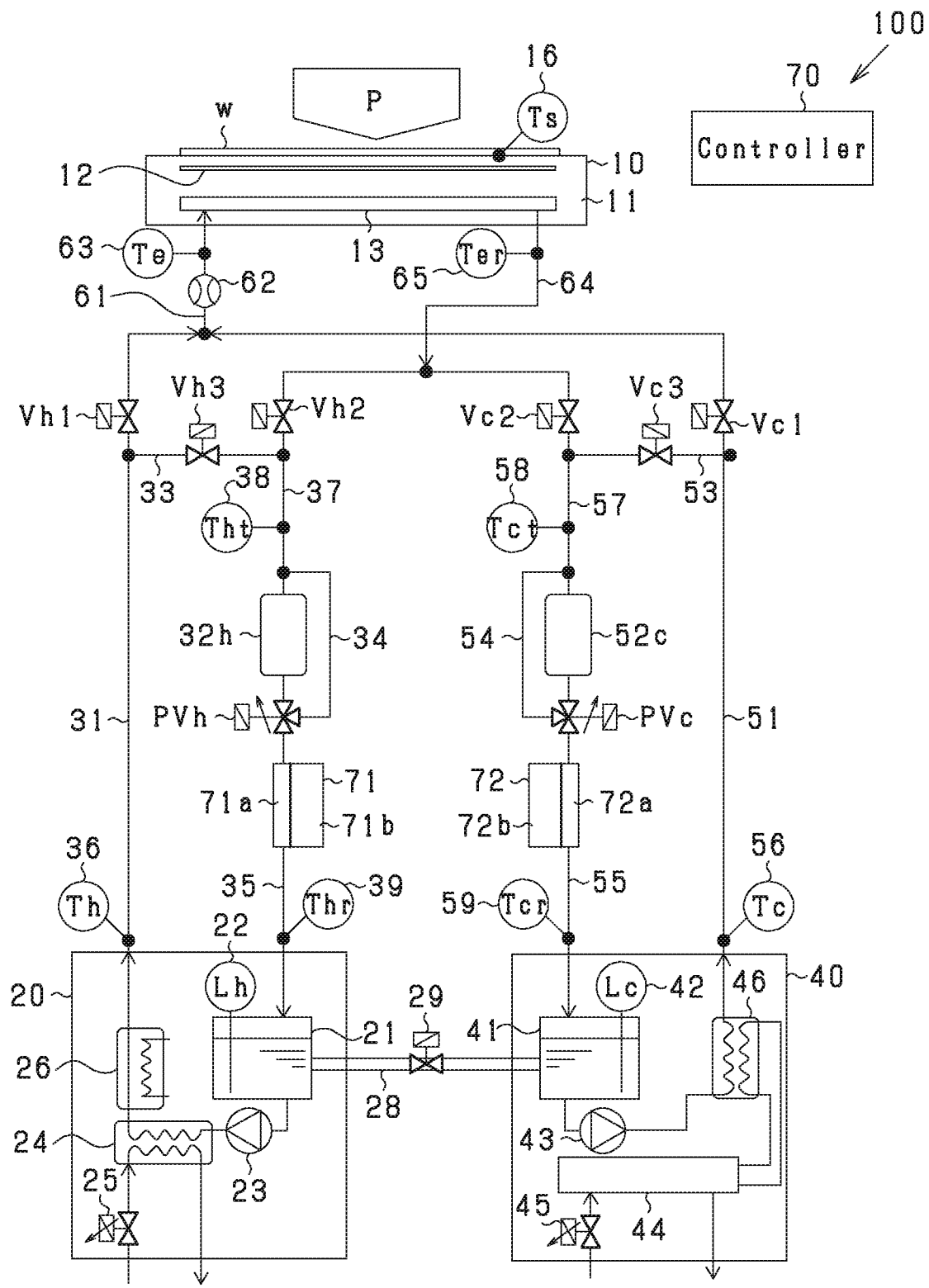
FIG. 8 is a circuit diagram of a modification of the temperature control system that is illustrated in FIG. 1.

Further, the temperature control system 100 in FIG. 1 may be modified as illustrated in FIG. 8. Note that the same components and sections as those in the temperature control system 100 are identified with the same reference signs and will not be described.

The temperature control system 100 may include a first heat accumulator 71 between the first mixing valve PVh and the first chiller 20. The first heat accumulator 71 includes a first flow channel 71a that includes a canal through which the heat medium flows and a first heat storage medium 71b. The first heat storage medium 71b is integrated with the first flow channel 71a. The first heat storage medium 71b changes in state between solid and liquid at a third temperature. Namely, the first heat storage medium 71b stores thermal energy based on the change in state at the third temperature. The third temperature is defined according to the controls of each embodiment described earlier, which is higher than the temperature of the heat medium that is held in the first tank 32h after the state is switched from the state in which the heat medium is supplied to the stage 10 via the second supply valve Vc1 to the state in which the heat medium is supplied to the stage 10 via the first supply valve Vh1 and lower than 60 [° C.] (the first temperature). The temperature of the heat medium that is held in the first tank 32h after the state is switched from the state in which the heat medium is supplied to the stage 10 via the second supply valve Vc1 to the state in which the heat medium is supplied to the stage 10 via the first supply valve Vh1 may be defined in advance based on a test.

According to the configuration, the first heat accumulator 71 passes the heat medium and stores the thermal energy based on the change in state of the first heat storage medium 71b at the third temperature. Here, the third temperature is lower than 60 [° C.]. Therefore, in the second state, the flow of the heat medium at 60 [° C.], which is higher than the third temperature, causes the change in state of the heat storage medium 71b and thus the thermal energy can be stored in the first heat accumulator 71. Then, the heat medium at the temperature lower than the third temperature held in the first tank 32h after the state is switched from the second state to the first state can be returned to the first chiller 20 via the first accumulator 71. With the thermal energy stored in the first heat accumulator 71, the heat medium that has returned from the first tank 32h to the first chiller 20 can be heated. According to the configuration, the heat medium at the temperature lower than the third temperature is less likely to return to the first chiller 20 and thus an increase in peak value of the power consumption of the first chiller 20 is less likely to occur.

Similarly, the temperature control system 100 may include a second heat accumulator 72 between the second mixing valve PVc and the second chiller 40. The second heat accumulator 72 includes a second flow channel 72a that includes a canal through which the heat medium flows and a second heat storage medium 72b. The second heat storage medium 72b is integrated with the second flow channel 72a. The second heat storage medium 72b changes in state between solid and liquid at a fourth temperature. Namely, the second heat storage medium 72b stores thermal energy based on the change in state at the fourth temperature. The fourth temperature is defined according to the controls of each embodiment described earlier, which is less than the temperature of the heat medium that is held in the second tank 52c after the state is switched from the state in which the heat medium is supplied to the stage 10 via the first supply valve Vhf to the state in which the heat medium is supplied to the stage 10 via the second supply valve Vc1 and higher than −10 [° C.] (the second temperature). The temperature of the heat medium that is held in the second tank 52c after the state is switched from the state in which the heat medium is supplied to the stage 10 via the first supply valve Vhf to the state in which the heat medium is supplied to the stage 10 via the second supply valve Vc1 may be defined in advance based on a test. According to the configuration, an increase in peak value of the power consumption of the second chiller 40 is less likely to occur after the state is switched from the first state to the second state.

Figure 9:
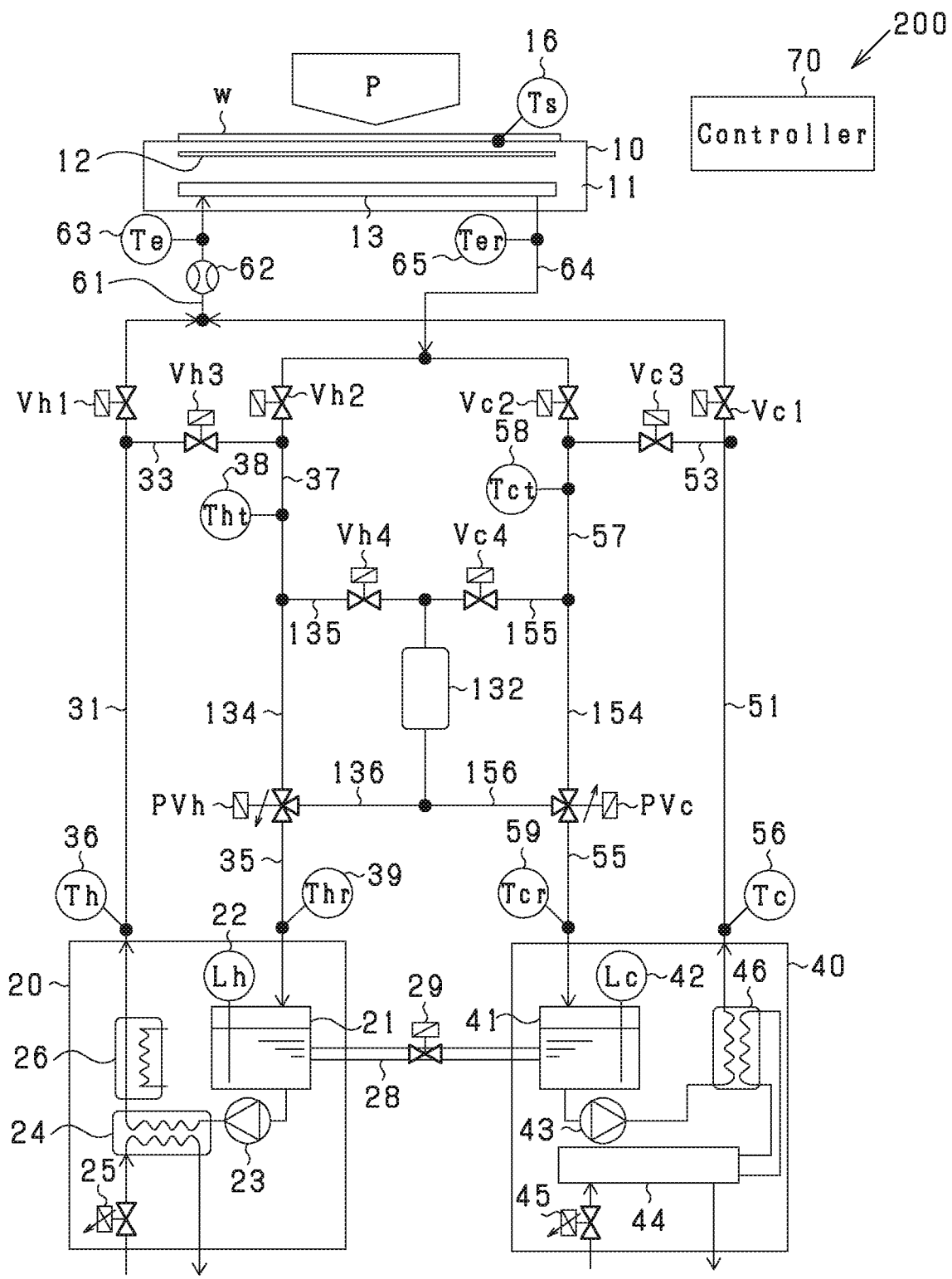
FIG. 9 is a circuit diagram of a temperature control system.

FIG. 9 is a circuit diagram of a temperature control system 200.

The temperature control system 200 will be described with a focus on differences between the temperature control systems 100 and 200. The same components and sections as those in the temperature control system 100 are identified with the same reference signs and will not be described.

The temperature control system 200 includes a tank 132 in addition to the first tank 32h and the second tank 52c of the temperature control system 100. The capacity of the tank 132 to hold the heat medium is defined as a fluid capacity MM. The tank 132 holds the heat medium to be returned from the stage 10 to the first chiller 20 up to the fluid capacity MM and drains the heat medium by an amount that exceeds the fluid capacity MM. The fluid capacity MM will be described later.

A canal through which the heat medium flows is disposed inside the tank 132. The heat medium that has flowed into the tank 132 flows through the canal and gradually exits the tank 132. Namely, the heat medium that flows into the tank 132 is less likely to be mixed with the heat medium that has been held in the tank 132.

The first return valve Vh2 is disposed in the first return channel 37. The first return valve Vh2 opens and closes the first return channel 37. The first target object bypass channel 33 allows the heat medium to bypass the stage 10 and to return downstream of the first return valve Vh2. A first tank return channel 135 and a third tank bypass channel 134 (corresponding to a first tank bypass channel) are connected in parallel to the section of the first return channel 37 downstream of the first return valve Vh2.

The first tank return channel 135 is connected to an inlet of the tank 132. A first tank return valve Vh4 is disposed in the first tank return channel 135. The first tank return valve Vh4 opens and closes the first tank return channel 135. Namely, the first tank return valve Vh4 allows and blocks the return of the heat medium from the downstream sides of the first return valve Vh2 and the first bypass channel 33 to the tank 132. An outlet of the tank 132 and the first mixing valve PVh are connected by a first tank return channel 136.

The first return channel 37 and the first mixing valve PVh are connected by the third tank bypass channel 134. Namely, the third tank bypass channel 134 allows the heat medium to bypass the tank 132 and to return from the downstream sides of the first return valve Vh2 and the first target object bypass channel 33 to the downstream side of the tank 132. The first return valve Vh2 allows and blocks the return of the heat medium from the stage 10 to the tank 132 and the first chiller 20. The first mixing valve PVh adjusts the mixing ratio of the heat medium that flows from the tank 132 into the first chiller 20 to the heat medium that flow from the third tank bypass channel 134 into the first chiller 20.

A high temperature circulation supply system is constituted of the first chiller 20, the first supply channel 31, the first supply valve Vh1, the first return channel 37, the first return valve Vh2, the first target object bypass channel 33, the first on-off valve Vh3, the first tank return channels 135, 136, the first tank return valve Vh4, the third tank bypass channel 134, the first mixing valve PVh, and the first return channel 35.

The temperature control system 200 includes a low temperature circulation supply system that is paired with the high temperature circulation supply system. The low temperature circulation supply system includes the second chiller 40, the second supply channel 51, the second supply valve Vc1, the second return channel 57, the second return valve Vc2, the second target object bypass channel 53, the second on-off valve Vc3, the second tank return channels 155, 156, the second tank return valve Vc4, a fourth tank bypass channel 154 (corresponding to a second tank bypass channel), the second mixing valve PVc, and the second return channel 5, which correspond to those in the high temperature circulation supply system.

The second return valve Vc2 is disposed in the second return channel 57. The second return valve Vc2 opens and closes the second return channel 57. The second target object bypass channel 53 allows the heat medium to bypass the stage 10 and to return downstream of the second return valve Vc2. The second tank return channel 155 and the fourth tank bypass channel 154 are connected in parallel to the section of the second return channel 57 downstream of the second return valve Vc2.

The second tank return channel 155 is connected to the inlet of the tank 132. The second tank return valve Vc4 is disposed in the second tank return channel 155. The second tank return valve Vc4 opens and closes the second tank return channel 155. Namely, the second tank return valve Vc4 allows and blocks the return of the heat medium from the downstream sides of the second return valve Vc2 and the second target object bypass channel 53 to the tank 132. The outlet of the tank 132 and the second mixing valve PVc are connected by the second tank return channel 156.

The second return channel 57 and the second mixing valve PVc are connected by the fourth tank bypass channel 154. Namely, the fourth tank bypass channel 154 allows the heat medium to bypass the tank 132 and to return from the downstream sides of the second return valve Vc2 and the second target object bypass channel 53 to the downstream side of the tank 132. The second return valve Vc2 allows and blocks the return of the heat medium from the stage 10 to the tank 132 and the second chiller 40. The second mixing valve PVc adjusts the mixing ratio of the heat medium that flows from the tank 132 into the second chiller 40 to the heat medium that flows from the fourth tank bypass channel 154 to the second chiller 40.

The temperature control system 200 executes controls to set a third state and a fourth state corresponding to the first state and the second state in the temperature control system 100, respectively.

In the third state, the controller 70 controls the first supply valve Vh1 to supply the heat medium from the first chiller 20 to the stage 10, controls the first return valve Vh2 to return the heat medium from the stage 10 to the tank 132 and the first chiller 20, controls the first on-off valve Vh3 to close the first target object bypass channel 33, controls the second supply valve Vc1 to block the flow of the heat medium from the second chiller 40 to the stage 10, controls the second return valve Vc2 to block the flows of the heat medium from the stage 10 to the tank 132 and the second chiller 40, and controls the second on-off valve Vc3 to open the second target object bypass channel 53.

In the fourth state, the controller 70 controls the first supply valve Vh1 to block the flow of the heat medium from the first chiller 20 to the stage 10, controls the first return valve Vh2 to block the flows of the heat medium from the stage 10 to the tank 132 and the first chiller 20, controls the first on-off valve Vh3 to open the first target object bypass channel 33, controls the second supply valve Vc1 to supply the heat medium from the second chiller 40 to the stage 10, controls the second return valve Vc2 to return the heat medium from the stage 10 to the tank 132 and the second chiller 40, and controls the second on-off valve Vc3 to close the second target object bypass channel 53.

Fourth Embodiment

In a fourth embodiment, when the state is switched from the third state to the fourth state, controls are executed to gradually release the heat medium that has been returned from the exchange section at the temperature higher than −10 [° C.] and temporarily held in the tank 132.

Figure 10:
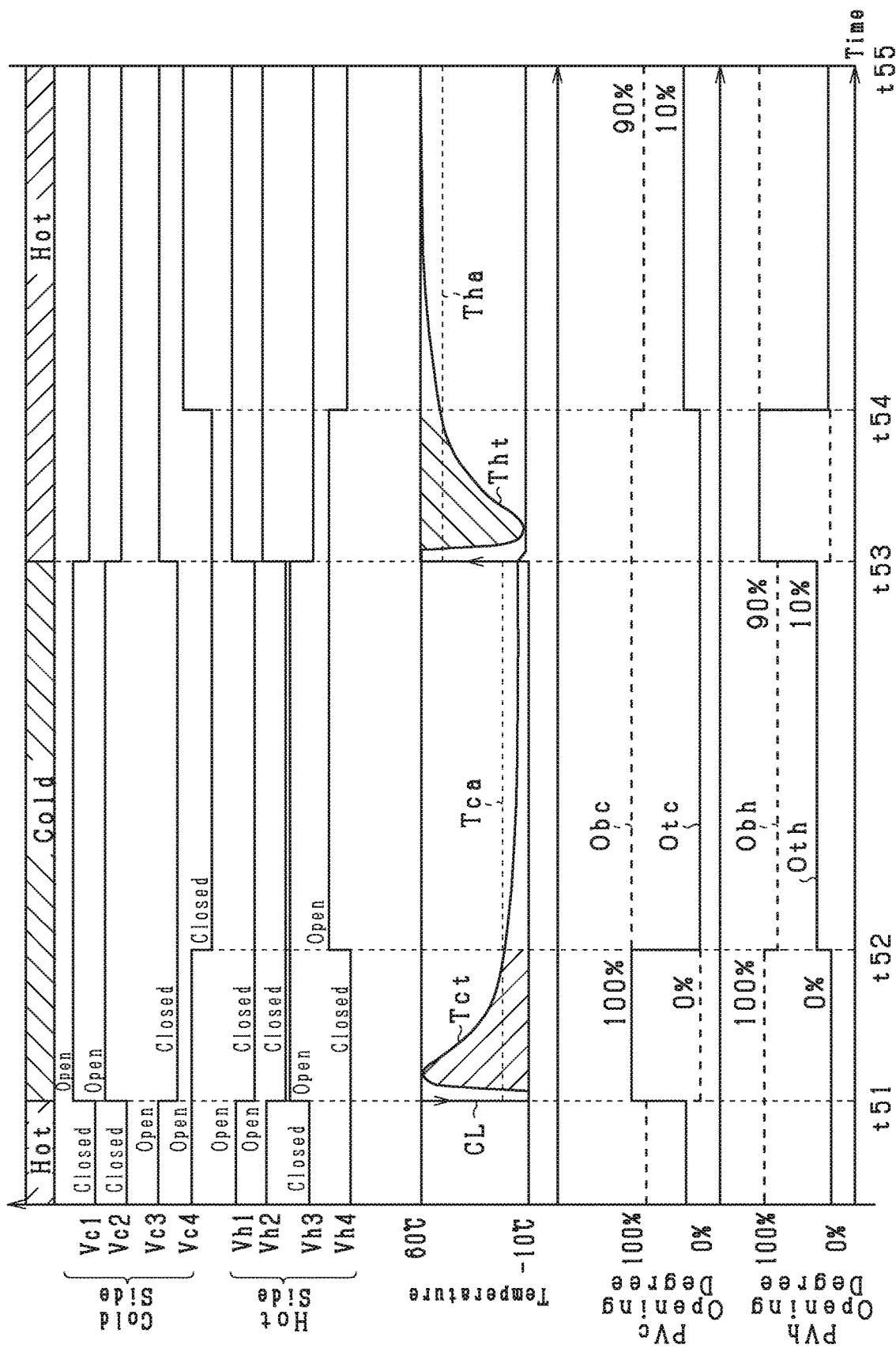
FIG. 10 is a time chart illustrating on and off states of each valve, temperatures Tct and Tht of the heat media that is returned downstream of each return valve, opening degree of the second mixing valve PVc, and opening degree of the first mixing valve PVh in a fourth embodiment.

FIG. 10 is a time chart illustrating open and closed states of each valve, temperatures Tct and Tht of the heat medium that is returned downstream of the valves Vc2 and Vh2, opening degree of the second mixing valve PVc, and opening degree of the first mixing valve PVh.

In the third state until time T51, the controller 70 controls the first supply valve Vh1, the first return valve Vh2, the first on-off valve Vh3, the second supply valve Vc1, the second return valve Vc2, and the second on-off valve Vc3 as described earlier. Further, the controller 70 controls the first tank return valve Vh4 to block the flow of the heat medium from the downstream sides of the first return valve Vh2 and the first target object bypass channel 33 to the tank 132, and controls the second tank return valve Vc4 to return the heat medium from the downstream sides of the second return valve Vc2 and the second target object bypass channel 53 to the tank 132. Through the controls, the heat medium at 60 [° C.] is supplied to the stage 10 and returned downstream of the first return channel 37, the heat medium at 60 [° C.] flows through the second target object bypass channel 53 to bypass the stage 10 and returns downstream of the second return channel 57, and the second return channel 57 is closed by the second return valve Vc2.

Further, the controller 70 controls the first mixing valve PVh to set its opening degree Oth on the first tank 32h side to 0 [%] and its opening degree Obh on the first tank bypass channel 34 side to 100 [%]. Namely, the controller 70 controls the first mixing valve PVh to block the flow of the heat medium from the tank 132 into the first chiller 20 and to allow the flow of the heat medium from the third tank bypass channel 134 into the first chiller 20.

Further, the controller 70 controls the second mixing valve PVc to set its opening degree Otc on the tank 132 side to 0 [%] and its opening degree Obc on the fourth tank bypass channel 154 side to 90 [%]. Namely, the controller 70 controls the second mixing valve PVc to allow the flow of the heat medium from the tank 132 into the second chiller 40 and the flow of the heat medium from the fourth tank bypass channel 154 into the second chiller 40.

At time t51, the controller 70 switches the state from the third state to the fourth state. In the fourth state, the controller 70 controls the first supply valve Vh1, the first return valve Vh2, the first on-off valve Vh3, the second supply valve Vc1, the second return valve Vc2, and the second on-off valve Vc3 as described earlier. Through the controls, the heat medium at 60 [° C.] flows through the first target object bypass channel 33 to bypass the stage 10 and returns downstream of the first return channel 37, the first return channel 37 is closed by the first return valve Vh2, and the heat medium at −10 [° C.] is supplied to the stage 10 and returned downstream of the second return channel 57.

Further, the controller 70 controls the second mixing valve PVc to set its opening degree Otc on the tank 132 side to 100 [%] and its opening degree Obc on the fourth tank bypass channel 154 side to 0 [%]. Namely, when the state is switched from the third state to the fourth state, the controller 70 starts the control of the second mixing valve PVc to allow the flow of the heat medium from the tank 132 into the second chiller 40 and to block the flow of the heat medium from the fourth tank bypass channel 154 into the second chiller 40.

At time t52, the controller 70 controls the second tank return valve Vc4 to block the flow of the heat medium to the tank 132 and controls the first tank return valve Vh4 to return the heat medium to the tank 132. Further, the controller 70 controls the second mixing valve PVc to set its opening degree Otc on the tank 132 side to 0 [%] and its opening degree Obc on the fourth tank bypass channel 154 side to 100 [%] and controls the first mixing valve PVh to set its opening degree Oth on the tank 132 side to 10 [%] and its opening degree Obh on the third tank bypass channel 134 side to 90 [%]. Namely, the controller 70 starts the control of the first mixing valve PVh to allow the flow of the heat medium from the tank 132 into the first chiller 20 in the amount less than the amount of the heat medium that flows from the third tank bypass channel 134 into the first chiller 20.

Here, time t52 is the time at which the temperature Tct of the heat medium that has returned to the tank 132 reaches an average temperature Tca, which is an average of temperatures Tct of the heat medium in a period from t51 to t53. Note that the average temperature Tca may be defined in advance based on a test. In this embodiment, the fluid capacity MM, which is a capacity of the tank 132 to hold the heat medium, is set to an amount of the heat medium that has returned to the tank 132 in the period from time t51 to time t53. The fluid capacity MM is a capacity defined by adding an amount of the fluid based on the heat capacity of the exchange section (at least the stage 10) to the fluid capacity of the exchange section (at least the stage 10). Namely, the controller 70 starts control of the first mixing valve PVh to allow the flow of the heat medium from the tank 132 into the first chiller 20 in the amount less than the amount of the heat medium that flows from the third tank bypass channel 134 into the first chiller 20 when the amount of the heat medium that has flowed into the tank 132 since the switching of the state from the third state to the fourth state reaches the fluid capacity MM.

At time t53, the controller 70 switches the state from the fourth state to the third state. In the third state, the controller 70 controls the first supply valve Vh1, the first return valve Vh2, the first on-off valve Vh3, the second supply valve Vc1, the second return valve Vc2, and the second on-off valve Vc3 as described earlier. Through the controls, the heat medium at 60 [° C.] is supplied to the stage 10 and returned downstream of the first return channel 37, the heat medium flows through the second target object bypass channel 53 to bypass the stage 10 and returns downstream of the second return channel 57, and the second return channel 57 is closed by the second return valve Vc2.

Further, the controller 70 controls the first mixing valve PVh to set its opening degree Oth on the tank 132 side to 100 [%] and its opening degree Obh on the third tank bypass channel 134 side to 0 [%]. Namely, when the state is switched from the fourth state to the third state, the controller 70 starts the control of the first mixing valve PVh to allow the flow of the heat medium from the tank 132 into the first chiller 20 and to block the flow of the heat medium from the third tank bypass channel 134 into the first chiller 20.

At time t54, the controller 70 controls the second tank return valve Vc4 to return the heat medium to the tank 132, and controls the first tank return valve Vh4 to block the flow of the heat medium to the tank 132. Further, the controller 70 controls the second mixing valve PVc to set its opening degree Otc on the tank 132 side to 10 [%] and its opening degree Obc on the fourth tank bypass channel 154 side to 90 [%] and controls the first mixing valve PVh to set its opening degree Oth on the tank 132 side to 0 [%] and its opening degree Obh on the third tank bypass channel 134 side to 100 [%]. Namely, the controller 70 starts the control of the first mixing valve PVh to allow the flow of the heat medium from the tank 132 into the second chiller 40 in the amount less than the amount of the heat medium that flows from the fourth tank bypass channel 154 into the second chiller 40.

Here, time t54 is the time at which the temperature Tht of the heat medium that has returned to the tank 132 reaches an average temperature Tha, which is an average of temperatures Tht of the heat medium in a period from t53 to t55. Note that the average temperature Tha may be defined in advance based on a test. The fluid capacity MM, which is the capacity of the tank 132 to hold the heat medium, may be set to an amount of the heat medium that is returned to the tank 132 in the period from time t53 to time t54. Namely, the controller 70 starts control of the second mixing valve PVc to allow the flow of the heat medium from the tank 132 into the second chiller 40 in the amount less than the amount of the heat medium that flows from the fourth tank bypass channel 154 into the second chiller 40 when the amount of the heat medium that has flowed into the tank 132 since the switching of the state from the fourth state to the third state reaches the fluid capacity MM.

At time t55, the controller 70 executes controls similar to the controls that are executed at time t51 and then the controller 70 executes the controls the same as the controls that are executed in a period from time t51 to time t55.

The embodiment described in detail above has the following advantages.

Through the control of the first supply valve Vh1, the first return valve Vh2, and the first on-off valve Vh3 by the controller 70, the state can be switched between the state in which the heat medium at 60 [° C.] is supplied to the stage 10 and returned upstream of the tank 132 and the first chiller 20 and the state in which the heat medium at 60 [° C.] flows through the first target object bypass channel 33 to bypass the stage 10 and returns downstream of the first return valve Vh2. Similarly, through the control of the second supply valve Vc1, the second return valve Vc2, and the second on-off valve Vc3 by the controller 70, the state can be switched between the state in which the heat medium at −10 [° C.] is supplied to the stage 10 and returned upstream of the tank 132 and the second chiller 40 and the state in which the heat medium at −10 [° C.] flows through the second target object bypass channel 53 to bypass the stage 10 and returns downstream of the second return valve Vc2.

The state can be switched between the third state and the fourth state. In the third state, the heat medium at 60 [° C.] is supplied to the stage 10 and returned upstream of the tank 132 and the first chiller 20, the heat medium at −10 [° C.] flows through the second target object bypass channel 53 to bypass the stage 10 and returns downstream of the second return valve Vc2, the flows of the heat medium from the stage 10 to the tank 132 and the second chiller 40 are blocked by the second return valve Vc2. In the fourth state, the heat medium at −10 [° C.] is supplied to the stage 10 and returned upstream of the tank 132 and the second chiller 40, the heat medium at 60 [° C.] flows through the first target object bypass channel 33 to bypass the stage 10 and returns downstream of the first return valve Vh2, and the flows of the heat medium from the stage 10 to the tank 132 and the first chiller 20 are blocked by the first return valve Vh2. Through the controls, the temperature of the stage 10 can be changed.

The fourth tank bypass channel 154 allows the heat medium to bypass the tank 132 and to return from the downstream sides of the second return valve Vc2 and the second target object bypass channel 53 to the downstream side of the tank 132. The second tank return valve Vc4 allows and inhibits the return of the heat medium from the downstream sides of the second return valve Vc2 and the second target object bypass channel 53 to the tank 132. The second mixing valve PVc adjusts the mixing ratio of the heat medium that flows from the tank 132 into the second chiller 40 to the heat medium that flows from the fourth tank bypass channel 154 to the second chiller 40. Therefore, the state in which the heat medium is fed from the tank 132 into the second chiller 40 and the flow of the heat medium from the fourth tank bypass channel 154 into the second chiller 40 is blocked can be established. According to the configuration, the heat medium at the temperature higher than −10 [° C.] is less likely to flow into the second chiller 40 and thus an increase in peak value of the power consumption of the second chiller 40 is less likely to occur. Further, while the heat in the amount corresponding to the heat capacity and the temperature of the stage 10 remains, the heat medium flows from the tank 132 into the second chiller 40 while the flow of the heat medium from the fourth tank bypass channel 154 into the second chiller 40 is blocked and thus the heat medium that is heated due to the heat that remains in the exchange section (at least the stage 10) is less likely to return to the second chiller 40. According to the configuration, the increase in peak value of the power consumption of the second chiller 40 is further less likely to occur.

Then, the flow rate of the heat medium that flows from the tank 132 into the first chiller 20 is reduced and the flow rate of the heat medium from the third tank bypass channel 134 into the first chiller 20 is increased to allow the heat medium at the temperature lower than 60 [° C.] to gradually flow into the first chiller 20. According to the configuration, an increase in peak value of the power consumption of the first chiller 20 is less likely to occur when the heat medium at the temperature lower than 60 [° C.] is released from the tank 132. Similarly, an increase in peak value of the power consumption of the second chiller 40 is less likely to occur when the state is switched from the fourth state to the third state.

Through the switching of the state to the third state by the controller 70, the heat medium at 60 [° C.] is supplied to the stage 10 and returned upstream of the tank 132 and the first chiller 20, the heat medium at −10 [° C.] flows through the second target object bypass channel 53 to bypass the stage 10 and returns downstream of the second return valve Vc2, and the flows of the heat medium from the stage 10 to the tank 132 and the second chiller 40 are blocked by the second return valve Vc2. Further, through the switching of the state to the fourth state by the controller 70, the heat medium at −10 [° C.] is supplied to the stage 10 and returned upstream of the tank 132 and the second chiller 40, the heat medium at 60 [° C.] flows through the first target object bypass channel 33 to bypass the stage 10 and returns downstream of the first return valve Vh2, and the flows of the heat medium from the stage 10 to the tank 132 and the first chiller 20 are blocked by the first return valve Vh2, as described earlier.

In the third state, the controller 70 controls the first tank return valve Vh4 to block the flow of the heat medium from the downstream sides of the first return valve Vh2 and the first target object bypass channel 33 to the tank 132 and controls the first mixing valve PVh to block the flow of the heat medium from the tank 132 into the first chiller 20 and to allow the flow of the heat medium from the third tank bypass channel 134 into the first chiller 20. Through the controls, the flow of the heat medium at 60 [° C.] is less likely to flow into the tank 132 and the temperature of the third tank bypass channel 134 is less likely to deviate from 60 [° C.]. Further, in the third state, the controller 70 controls the second tank return valve Vc4 to return the heat medium from the downstream sides of the second return valve Vc2 and the second target object bypass channel 53 to the tank 132 and controls the second mixing valve PVc to allow the flow of the heat medium from the tank 132 to the second chiller 40 and the flow of the heat medium from the fourth tank bypass channel 154 to the second chiller 40. Therefore, in the third state, the heat medium at −10 [° C.] can be held in the tank 132 and the temperature of the fourth tank bypass channel 154 is less likely to deviate from −10 [° C.].

When the state is switched from the third state to the fourth state, the controller 70 starts the control of the second mixing valve PVc to allow the flow of the heat medium from the tank 132 into the second chiller 40 and to block the flow of the heat medium from the fourth tank bypass channel 154 into the second chiller 40. Through the control, the flow of the heat medium at the temperature higher than −10 [° C.] is less likely to flow into the second chiller 40 and thus an increase in peak value of the power consumption of the second chiller 40 is less likely to occur.

The fluid capacity MM is the capacity defined by adding the amount of the fluid based on the heat capacity of the exchange section (at least the stage 10) to the fluid capacity of the exchange section (at least the stage 10). The controller 70 maintains the state of the second mixing valve PVc until the amount of the heat medium that has flowed into the tank 132 since the switching of the state from the third state to the fourth state reaches the fluid capacity MM. Through the control, the heat medium at the temperature higher than −10 [° C.] is less likely to return to the second chiller 40 after the amount of the heat medium that has flowed into the tank 132 reaches the amount corresponding to the fluid capacity of the exchange section. Therefore, the increase in peak value of the power consumption of the second chiller 40 is further less likely to occur. Then, the controller 70 starts the control of the second tank return valve Vc4 to block the flow of the heat medium to the third tank 132, the control of the first tank return valve Vh4 to return the heat medium to the tank 132, and the control of the first mixing valve PVh to allow the flow of the heat medium from the tank 132 into the first chiller 20 in the amount less than the amount of the heat medium that flows from the third tank bypass channel 134 to the first chiller 20. Through the controls, when the heat medium at the temperature higher than −10 [° C.] is released from the tank 132 to the second chiller 40, an increase in peak value of the power consumption of the second chiller 40 is less likely to occur.

Fifth Embodiment

A fifth embodiment will be described with a focus on differences between the fourth embodiment and the fifth embodiment.

In the fifth embodiment, when the state is switched from the third state to the fourth state and the return of the heat medium at about 60 [° C.] from the exchange section to the first chiller 20 is completed, controls are executed to gradually release the heat medium that has been returned from the exchange section at the temperature higher than −10 [° C.] and temporally held in the tank 132 to the first chiller 20. Similarly, when the state is switched from the fourth state to the third state and the return of the heat medium at about −10 [° C.] from the exchange section to the second chiller 40 is completed, controls are executed to gradually release the heat medium that has been returned from the exchange section at the temperature lower than 60 [° C.] and temporally held in the tank 132 to the second hiller 40.

Figure 11:
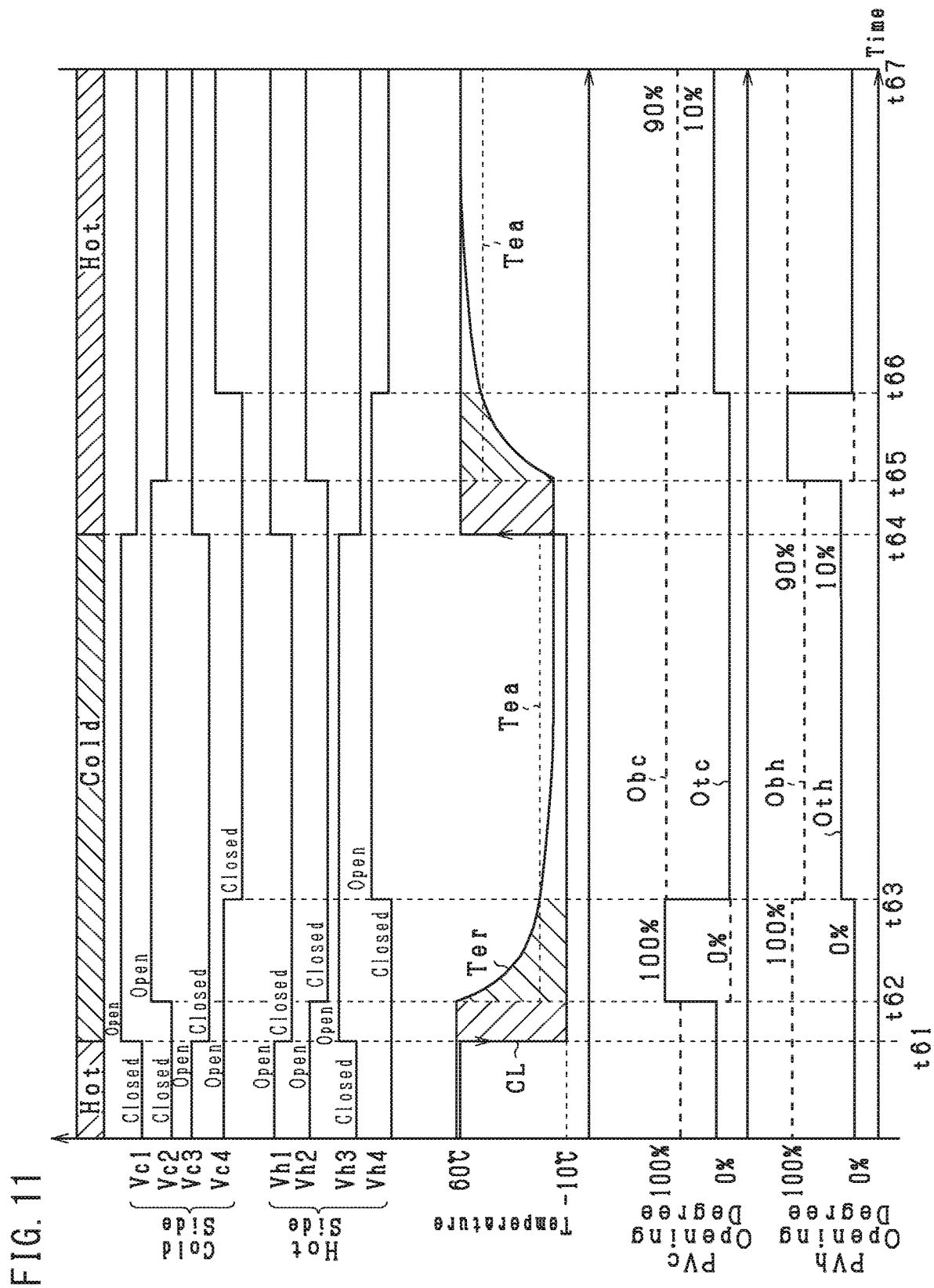
FIG. 11 is a time chart illustrating on and off states of each valve, temperature Ter of the heat medium that is returned from the stage, opening degree of the second mixing valve PVc, and opening degree of the first mixing valve PVh in a fifth embodiment.

FIG. 11 is a time chart illustrating open and closed state of the valves, temperature Ter of the heat medium that is returned from the stage 10, opening degree of the second mixing valve PVc, and opening degree of the first mixing valve PVh.

At time t61, the controller 70 controls the first supply valve Vh1 to block the flow of the heat medium from the first chiller 20 to the stage 10, controls the first on-off valve Vh3 to open the first target object bypass channel 33, controls the second supply valve Vc1 to supply the heat medium from the second chiller 40 to the stage 10, and controls the second on-off valve Vc3 to close the second target object bypass channel 53.

At time t62, the controller 70 controls the first return valve Vh2 to block the flows of the heat medium from the stage 10 to the tank 132 and the first chiller 20 and controls the second return valve Vc2 to return the heat medium from the stage 10 to the tank 132 and the second chiller 40. Through the controls, the state is switched to the fourth state. Further, the controller 70 controls the second mixing valve PVc to set its opening degree Otc on the tank 132 side to 100 [%] and its opening degree Obc on the fourth tank bypass channel 154 side to 0 [%]. Namely, when the state is switched to the fourth state, the controller 70 starts control of the second mixing valve PVc to allow the flow of the heat medium from the tank 132 into the second chiller 40 and to block the flow of the heat medium from the fourth tank bypass channel 154 into the second chiller 40.

Here, time t62 is the time at which the amount of the heat medium that has flowed from the exchange section since time t61 reaches the fluid capacity of the exchange section. Namely, the controller 70 switches the state to the fourth state when the amount of the heat medium that has flowed into the first chiller 20 since time t61 at which the controller 70 controls the first supply valve Vh1, the first on-off valve Vh3, the second supply valve Vc1, and the second on-off valve Vc3 reaches the fluid capacity of the exchange section (at least the stage 10).

At time t63, the controller 70 controls the second tank return valve Vc4 to block the flow of the heat medium to the tank 132 and controls the first tank return valve Vh4 to return the heat medium to the tank 132. Further, the controller 70 controls the second mixing valve PVc to set its opening degree Otc on the tank 132 side to 0 [%] and its opening degree Obc on the fourth tank bypass channel 154 side to 100 [%] and controls the first mixing valve PVh to set its opening degree Oth on the tank 132 side to 10 [%] and its opening degree Obh on the third tank bypass channel 134 side to 90 [%]. Namely, the controller 70 starts the control of the first mixing valve PVh to allow the flow of the heat medium from the tank 132 into the first chiller 20 in the amount less than the amount of the heat medium that flows from the third tank bypass channel 134 into the first chiller 20.

Here, time t63 is the time at which the temperature Ter of the heat medium that returns from the stage 10 reaches an average temperature Tea, which is an average of temperatures Ter of the heat medium in a period from t62 to t64. Note that the average temperature Tea may be defined in advance based on a test. In this embodiment, the fluid capacity MM, which is the capacity of the tank 132 to hold the heat medium, is set to an amount of the heat medium that has returned to the tank 132 in the period from time t62 to time t63. The fluid capacity MM is defined based on the heat capacity of the exchange section (at least the stage 10). Namely, when the amount of the heat medium that has flowed into the tank 132 since the switching of the state to the fourth state reaches the fluid capacity MM, the controller 70 starts the control of the first tank return valve Vh4 to allow the return of the heat medium to the tank 132, the control of the second tank return valve Vc4 to block the flow of the heat medium to the tank 132, and the control of the first mixing valve PVh to allow the flow of the heat medium from the tank 132 to the first chiller 20 in the amount less than the amount of the heat medium that flows from the third tank bypass channel 134 into the first chiller 20.

At time t64, the controller 70 controls the first supply valve Vh1 to supply the heat medium from the first chiller 20 to the stage 10, controls the first on-off valve Vh3 to close the first target object bypass channel 33, controls the second supply valve Vc1 to block the flow of the heat medium from the second chiller 40 to the stage 10, and controls the second on-off valve Vc3 to open the second target object bypass channel 53.

At time t65, the controller 70 controls the first return valve Vh2 to return the heat medium from the stage 10 to the tank 132 and the first chiller 20 and controls the second return valve Vc2 to block the flows of the heat medium from the stage 10 to the tank 132 and the second chiller 40. Through the controls, the state is switched to the third state. Further, the controller 70 controls the first mixing valve PVh to set its opening degree Oth on the tank 132 side to 100 [%] and its opening degree Obh on the third tank bypass channel 134 side to 0 [%]. Namely, when the state is switched to the third state, the controller 70 starts the control of the first mixing valve PVh to allow the flow of the heat medium from the tank 132 into the first chiller 20 and to block the flow of the heat medium from the third tank bypass channel 134 into the first chiller 20.

Here, time t65 is the time at which the amount of the heat medium that has flowed from the exchange section since time t64 reaches the fluid capacity of the exchange section. Namely, the controller 70 switches the state to the third state when the amount of the heat medium that has flowed into the second chiller 40 since time t64 at which the controller 70 controls the first supply valve Vh1, the first on-off valve Vh3, the second supply valve Vc1, and the second on-off valve Vc3 reaches the fluid capacity of the exchange section (at least the stage 10).

At time t66, the controller 70 controls the first tank return valve Vh4 to block the flow of the heat medium to the tank 132 and controls the second tank return valve Vc4 to return the heat medium to the tank 132. Further, the controller 70 controls the second mixing valve PVc to set its opening degree Otc on the tank 132 side to 10 [%] and its opening degree Obc on the fourth tank bypass channel 154 side to 90 [%] and controls the first mixing valve PVh to set its opening degree Oth on the tank 132 side to 0 [%] and its opening degree Obh on the third tank bypass channel 134 side to 100 [%]. Namely, the controller 70 starts the control of the second mixing valve PVc to allow the flow of the heat medium from the tank 132 into the second chiller 40 in the amount less than the amount of the heat medium that flows from the fourth tank bypass channel 154 into the second chiller 40.

Here, time t66 is the time at which the temperature Ter of the heat medium that is returned from the stage 10 reaches an average temperature Tea, which is an average of temperatures Ter of the heat medium in a period from t65 to t67. The average temperature Tea may be defined in advance based on a test. The fluid capacity MM, which is the capacity of the tank 132 to hold the heat medium, may be set to an amount of the heat medium that is returned to the tank 132 in the period from time t65 to time t66. The fluid capacity MM is defined based on the heat capacity of the exchange section (at least the stage 10). Namely, when the amount of the heat medium that has flowed into the tank 132 since the switching of the state to the third state reaches the fluid capacity MM, the controller 70 starts the control of the first tank return valve Vh4 to block the flow of the heat medium to the tank 132, the control of the second tank return valve Vc4 to return the heat medium to the tank 132, and the control of the second mixing valve PVc to allow the flow of the heat medium from the tank 132 into the second chiller 40 in the amount less than the amount of the heat medium that flows from the fourth tank bypass channel 154 into the second chiller 40.

At time t67, the controller 70 executes controls similar to the controls that are executed at time t61, and then the controller 70 repeatedly executes the controls the same as the controls that are executed in a period from time t61 to time t67.

The embodiment described in detail above has the following advantages.

From the third state, the controller 70 controls the first supply valve Vh1 to block the flow of the heat medium from the first chiller 20 to the stage 10 and the second supply valve Vc1 to supply the heat medium from the second chiller 40 to the stage 10. Through the controls, the heat medium at 60 [° C.] is less likely to flow into the second chiller 40 when the state is switched from the state in which the heat medium at 60 [° C.] is supplied from the first chiller 20 to the stage 10 to the state in which the heat medium at −10 [° C.] is supplied from the second chiller 40 to the stage 10. Further, the controller 70 switches the state to the fourth state when the amount of the heat medium that has flowed into the first chiller 20 since then reaches the fluid capacity of the exchange section (at least the stage 10). Through the controls, the heat medium in the amount corresponding to the fluid capacity of the exchange section is less likely to flow into the second chiller 40 and thus an increase in peak value of the power consumption of the second chiller 40 is less likely to increase.

The fluid capacity MM is defined based on the heat capacity of the exchange section (at least the stage 10). When the state is switched to the fourth state, the controller 70 starts the control of the second mixing valve PVc to allow the flow of the heat medium from the tank 132 into the second chiller 40 and to block the flow of the heat medium from the fourth tank bypass channel 154 into the second chiller 40. Through the controls, the return of the heat medium at the temperature higher than −10 [° C.] to the second chiller 40 is less likely to occur after the amount of the heat medium that has returned to the first chiller 20 reaches the amount corresponding to the fluid capacity of the exchange section. Therefore, an increase in peak value of the power consumption of the second chiller 40 is less likely to occur. When the amount of the heat medium that has flowed into the tank 132 since the state is switched to the fourth state reaches the fluid capacity MM, the controller 70 starts the control of the first tank return valve Vh4 to allow the return of the heat medium to the tank 132, the control of the second tank return valve Vc4 to block the flow of the heat medium to the tank 132, and the control of the first mixing valve PVh to allow the flow of the heat medium from the tank 132 to the first chiller 20 in the amount less than the amount of the heat medium that flows from the third tank bypass channel 134 into the first chiller 20. Through the controls, an increase in peak value of the power consumption of the first chiller 20 is less likely to occur when the heat medium at the temperature lower than 60 [° C.] is released from the tank 132 to the first chiller 20.

Because the heat medium is fed into the tank 132 after the heat medium in the amount corresponding to the fluid capacity of the exchange section is fed into the first chiller 20, the fluid capacity MM of the tank 132 can be reduced in comparison to that of the fourth embodiment.

Figure 12:
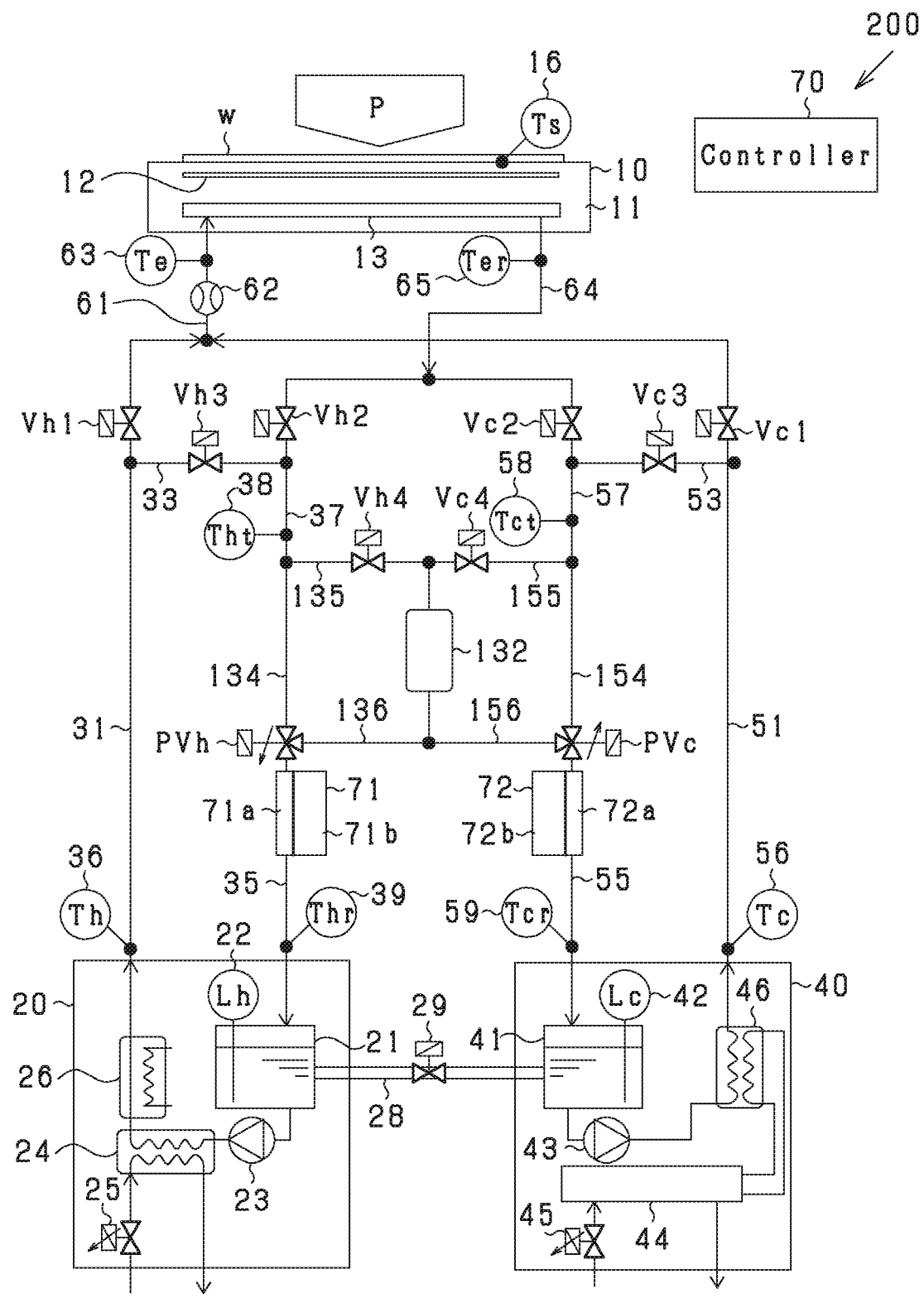
FIG. 12 is a circuit diagram of a modification of the temperature control system that is illustrated in FIG. 9.

Further, the temperature control system 200 in FIG. 9 may be modified as illustrated in FIG. 12. Note that the same components and sections as those in the temperature control system 100 in FIG. 8 and the temperature control system 200 in FIG. 9 are identified with the same reference signs and will not be described.

The temperature control system 200 includes a first heat accumulator 71 between the first mixing valve PVh and the first chiller 20. The third temperature is predefined based on the controls in each embodiment. The predefined third temperature is higher than the temperature of the heat medium in the tank 132 after the state is switched from the state in which the heat medium is supplied to the stage 10 via the second supply valve Vc1 to the state in which the heat medium is supplied to the stage 10 via the first supply valve Vhf and lower than 60 [° C.] (the first temperature). Note that the temperature of the heat medium in the tank 132 after the state is switched from the state in which the heat medium is supplied to the stage 10 via the second supply valve Vc1 to the state in which the heat medium is supplied to the stage 10 via the first supply valve Vh1 may be defined in advance based on a test.

According to the configuration, in the fourth state, the heat medium at the temperature higher than the third temperature (60 [° C.]) is passed through the first heat accumulator 70 to change the state of the first heat storage medium 71b and the thermal energy is stored in the first heat accumulator 71. After the state is switched from the fourth state to the third state, the heat medium in the tank 132 at the temperature lower than the third temperature can be returned to the first chiller 20 via the first heat accumulator 71. According to the configuration, the heat medium that is returned from the tank 132 to the first chiller 20 can be heated with the thermal energy stored in the first heat accumulator 71. Therefore, the heat medium at the temperature lower than the third temperature is less likely to return to the first chiller 20 and thus an increase in peak value of the power consumption of the first chiller 20 is less likely to occur.

Similarly, the temperature control system 100 includes a second heat accumulator 72 between the second mixing valve PVc and the second chiller 40. The fourth temperature is predefined based on the controls in each embodiment. The predefined fourth temperature is lower than the temperature of the heat medium in the tank 132 after the state is switched from the state in which the heat medium is supplied to the stage 10 via the first supply valve Vh1 to the state in which the heat medium is supplied to the stage 10 via the second supply valve Vc1 and higher than −10 [° C.] (the second temperature). Note that the temperature of the heat medium in the tank 132 after the state is switched from the state in which the heat medium is supplied to the stage 10 via the first supply valve Vh1 to the state in which the heat medium is supplied to the stage 10 via the second supply valve Vc1 may be defined in advance based on a test. According to the configuration, an increase in peak value of the power consumption of the second chiller 40 is less likely to occur after the state is switched from the third state to the fourth state.

The above embodiments may be modified and implemented as follows. The same components and sections as those in the embodiments are identified with the same reference signs and will not be described.

The flow rate of the heat medium that is pumped out of the chiller 20 or 40 may be arbitrarily set but should be constant during the repetition of the first state and the second state and the repetition of the third state and the fourth state.

Insides of the tanks 32h, 52c, and 132 may be divided by partitions to gradually drain the heat medium that has flowed into the tanks 32h, 52c, and 132 to outsides of the tanks 32h, 52c, and 132. Further, the heat medium that has flowed into the tanks 32h, 52c, and 132 may be mixed with the heat medium that has been stored in the tanks 32h, 52c, and 132 and drained.

Multiple temperature control systems 100 and an overall controller to execute total control of the temperature control systems 100 may be provided. Multiple temperature control systems 200 and an overall controller to execute total control of the temperature control systems 200 may be provided. Multiple temperature control systems 100, multiple temperature control systems 200, and an overall controller to execute total control of the temperature control systems 100 and the temperature control systems 200 may be provided. Because the increases in peak values of the power consumptions of the chillers 20 and 40 are less likely to occur, a peak value of power consumption of an entire facility that is equipped with some hundreds to thousands of temperature control systems 100 and/or 200 is less likely to be enormous. Therefore, the contract power of the facility can be significantly reduced and thus the costs can be reduced.

The driving of the first chiller 20 and the second chiller 40 is not limited to the electromotive driving and another type of driving such as an engine may be used. Even if such a configuration is applied to the temperature control systems 100 and 200, an increase in peak value of the power consumption is less likely to occur when the temperature of the stage 10 is changed.

The present disclosure has been described in conformity with examples but is not limited to the examples and the structures therein. Further, the present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

What is claimed is:

1. A temperature control system for controlling a temperature of a target object, the temperature control system comprising:
   a first chiller that adjusts a temperature of a fluid to a first temperature and pumps out the fluid;
   a first supply valve that controls a supply of the fluid from the first chiller to the target object;
   a first tank that holds the fluid that has returned from the target object to the first chiller up to a first fluid capacity and drains the fluid by an amount that exceeds the first fluid capacity;
   a first return valve that controls a return of the fluid from the target object to the first tank;
   a first target object bypass channel that allows the fluid to bypass the target object and return upstream of the first tank;
   a first on-off valve that opens and closes the first target object bypass channel;
   a first tank bypass channel that allows the fluid to bypass the first tank and return downstream of the first tank;
   a first mixing valve that adjusts a mixing ratio of the fluid flowing from the first tank into the first chiller to the fluid flowing from the first tank bypass channel into the first chiller;
   a second chiller that adjusts a temperature of the fluid to a second temperature that is lower than the first temperature and pumps out the fluid;
   a second supply valve that controls a supply of the fluid from the second chiller to the target object;
   a second tank that holds the fluid that has returned from the target object to the second chiller up to a second fluid capacity and drains the fluid by an amount that exceeds the second fluid capacity;
   a second return valve that controls a return of the fluid from the target object to the second tank;
   a second target object bypass channel that allows the fluid to bypass the target object and return upstream of the second tank;
   a second on-off valve that opens and closes the second target object bypass channel;
   a second tank bypass channel that allows the fluid to bypass the second tank and return downstream of the second tank;
   a second mixing valve that adjusts a mixing ratio of the fluid flowing from the second tank into the second chiller to the fluid flowing from the second tank bypass channel into the second chiller; and a controller that controls the first supply valve, the first return valve, the first on-off valve, the first mixing valve, the second supply valve, the second return valve, the second on-off valve, and the second mixing valve to control the temperature of the target object.

2. The temperature control system according to claim 1, wherein
the controller switches the temperature control system between a first state and a second state, in the first state, the controller:
controls the first supply valve to allow the supply of the fluid from the first chiller to the target object,
controls the first return valve to allow the return of the fluid from the target object to the first tank,
controls the first on-off valve to close the first target object bypass channel,
controls the second supply valve to block the supply of the fluid from the second chiller to the target object,
controls the second return valve to block the return of the fluid from the target object to the second tank, and
controls the second on-off valve to open the second target object bypass channel, and in the second state, the controller:
controls the first supply valve to block the supply of the fluid from the first chiller to the target object,
controls the first return valve to block the return of the fluid from the target object to the first tank,
controls the first on-off valve to open the first target object bypass channel,
controls the second supply valve to allow the supply of the fluid from the second chiller to the target object,
controls the second return valve to allow the return of the fluid from the target object to the second tank, and
controls the second on-off valve to close the second target object bypass channel.

3. The temperature control system according to claim 2, wherein in the first state, the controller controls:
the first mixing valve to allow the fluid to flow from the first tank into the first chiller and allow the fluid to flow from the first tank bypass channel into the first chiller; and
the second mixing valve to allow the fluid to flow from the second tank into the second chiller and allow the fluid to flow from the second tank bypass channel into the second chiller.

4. The temperature control system according to claim 2, wherein
the second fluid capacity is defined by adding an amount of the fluid based on a heat capacity of the target object to a fluid capacity of the target object,
once the temperature control system is switched from the first state to the second state, the controller starts to control the second mixing valve to allow the fluid to flow from the second tank into the second chiller and to stop the fluid from flowing from the second tank bypass channel into the second chiller, and
once an amount of the fluid that has flowed into the second tank since the temperature control system is switched to the second state reaches the second fluid capacity, the controller starts to control the second mixing valve to allow the fluid to flow from the second tank into the second chiller in an amount less than an amount of the fluid that flows from the second tank bypass channel into the second chiller.

5. The temperature control system according to claim 2, wherein
the second fluid capacity is defined by adding an amount of the fluid based on a heat capacity of the target object to a fluid capacity of the target object,
once the temperature control system is switched from the first state to the second state, the controller starts to control the second mixing valve to allow the fluid to flow from the second tank bypass channel into the second chiller in an amount less than an amount of the fluid that flows from the second tank into the second chiller, and
once a total amount of the fluid that has flowed into the second tank and the second tank bypass channel since the temperature control system is switched to the second state reaches the second fluid capacity, the controller starts to control the second mixing valve to allow the fluid to flow from the second tank into the second chiller in an amount less than an amount of the fluid that flows from the second tank bypass channel into the second chiller.

6. The temperature control system according to claim 2, wherein
the second fluid capacity is defined based on a heat capacity of the target object,
once an amount of the fluid that has flowed into the first chiller since the first and second supply valves are controlled reaches a fluid capacity of the target object, the controller switches the temperature control system from the first state to the second state,
once the temperature control system is switched to the second state, the controller starts to control the second mixing valve to allow the fluid to flow from the second tank into the second chiller and to stop the fluid from flowing from the second tank bypass channel into the second chiller, and
once an amount of the fluid that has flowed into the second tank since the temperature control system is switched to the second state reaches the second fluid capacity, the controller starts to control the second mixing valve to allow the fluid to flow from the second tank into the second chiller in an amount less than an amount of the fluid that flows from the second tank bypass channel into the second chiller.

7. The temperature control system according to claim 2, wherein
the second fluid capacity is defined based on a heat capacity of the target object,
once an amount of the fluid that has flowed into the first chiller since the first and second supply valves are controlled reaches a fluid capacity of the target object, the controller switches the temperature control system from the first state to the second state,
once the temperature control system is switched to the second state, the controller starts to control the second mixing valve to allow the fluid to flow from the second tank bypass channel into the second chiller in an amount less than an amount of the fluid that flows from the second tank into the second chiller, and
once a total amount of the fluid that has flowed into the second tank and the second tank bypass channel since the temperature control system is switched to the second state reaches the second fluid capacity, the controller starts to control the second mixing valve to allow the fluid to flow from the second tank into the second chiller in an amount less than an amount of the fluid that flows from the second tank bypass channel into the second chiller.

8. The temperature control system according to claim 2, wherein
the first fluid capacity is defined based on a heat capacity of the target object,
the second fluid capacity is defined based on the heat capacity of the target object,
in the first state, the controller controls the first mixing valve to stop the fluid from flowing from the first tank into the first chiller and to allow the fluid to flow from the first tank bypass channel into the first chiller,
once an amount of the fluid that has flowed into the first tank bypass channel since the first and second supply valves and the first mixing valve are controlled reaches a fluid capacity of the target object, the controller controls the first mixing valve to allow the fluid to flow from the first tank into the first chiller and to stop the fluid from flowing from the first tank bypass channel into the first chiller,
once an amount of the fluid that has flowed into the first tank since the first mixing valve is controlled reaches the fluid capacity of the target object, the controller controls the first mixing valve to allow the fluid to flow from the first tank into the first chiller in an amount less than an amount of the fluid that flows from the first tank bypass channel into the first chiller, switches the temperature control system from the first state to the second state, and controls the second mixing valve to allow the fluid to flow from the second tank into the second chiller and to stop the fluid from flowing from the second tank bypass channel into the second chiller, and
once an amount of the fluid that has flowed into the second tank since the temperature control system is switched to the second state reaches the second fluid capacity, the controller controls the second mixing valve to allow the fluid to flow from the second tank into the second chiller in an amount less than an amount of the fluid that flows from the second tank bypass channel into the second chiller.

9. The temperature control system according to claim 2, wherein
the first fluid capacity is defined based on a heat capacity of the target object,
the second fluid capacity is defined based on the heat capacity of the target object,
in the first state, the controller controls the first mixing valve to stop the fluid from flowing from the first tank into the first chiller and to allow the fluid to flow from the first tank bypass channel into the first chiller,
once an amount of the fluid that has flowed into the first tank bypass channel since the first and second supply valves and the first mixing valve are controlled reaches a fluid capacity of the target object, the controller controls the first mixing valve to allow the fluid to flow from the first tank bypass channel into the first chiller in an amount less than an amount of the fluid that flows from the first tank into the first chiller,
once a total amount of the fluid that has flowed into the first tank and the first tank bypass channel since the first mixing valve is controlled reaches the first fluid capacity, the controller controls the first mixing valve to allow the fluid to flow from the first tank into the first chiller in an amount less than an amount of the fluid that flows from the first tank bypass channel into the first chiller, switches the temperature control system from the first state to the second state, and controls the second mixing valve to allow the fluid to flow from the second tank bypass channel into the second chiller in an amount less than an amount of the fluid that flows from the second tank into the second chiller, and
once a total amount of the fluid that has flowed into the second tank and the second tank bypass channel since the temperature control system is switched to the second state reaches the second fluid capacity, the controller controls the second mixing valve to allow the fluid to flow from the second tank into the second chiller in an amount less than an amount of the fluid that flows from the second tank bypass channel into the second chiller.

10. The temperature control system according to claim 1 further comprising:
a first heat accumulator that is disposed between the first mixing valve and the first chiller, comprises a first heat storage medium, and stores thermal energy based on a state change of the first heat storage medium at a third temperature when the fluid passes through the first heat accumulator; and
a second heat accumulator that is disposed between the second mixing valve and the second chiller, comprises a second heat storage medium, and stores thermal energy based on a state change of the second heat storage medium at a fourth temperature when the fluid passes through the second heat accumulator, wherein
the third temperature is lower than the first temperature and higher than a temperature of the fluid that is held in the first tank after the temperature control system is switched from a state in which the fluid is supplied to the target object via the second supply valve to a state in which the fluid is supplied to the target object via the first supply valve, and
the fourth temperature is higher than the second temperature and lower than a temperature of the fluid that is held in the second tank after the temperature control system is switched from a state in which the fluid is supplied to the target object via the first supply valve to a state in which the fluid is supplied to the target object via the second supply valve.

11. A temperature control system for controlling a temperature of a target object, the temperature control system comprising:
a first chiller that adjusts a temperature of a fluid to a first temperature and pumps out the fluid;
a first supply valve that controls a supply of the fluid from the first chiller to the target object;
a tank that holds the fluid that has returned from the target object up to a fluid capacity and drains the fluid by an amount that exceeds the fluid capacity;
a first return valve that controls a return of the fluid from the target object to the tank and the first chiller;
a first target object bypass channel that allows the fluid to bypass the target object and return downstream of the first return valve;
a first on-off valve that opens and closes the first target object bypass channel;
a first tank bypass channel that allows the fluid to bypass the tank and return from downstream sides of the first return valve and the first target object bypass channel to a downstream side of the tank;
a first tank return valve that controls a return of the fluid from the downstream sides of the first return valve and the first target object bypass channel to the tank;

a first mixing valve that adjusts a mixing ratio of the fluid flowing from the tank into the first chiller to the fluid flowing from the first tank bypass channel into the first chiller;
a second chiller that adjusts a temperature of the fluid to a second temperature that is lower than the first temperature and pumps out the fluid;
a second supply valve that controls a supply of the fluid from the second chiller to the target object;
a second return valve that controls a return of the fluid from the target object to the tank and the second chiller;
a second target object bypass channel that allows the fluid to bypass the target object and return downstream of the second return valve;
a second on-off valve that opens and closes the second target object bypass channel;
a second tank bypass channel that allows the fluid to bypass the tank and return from downstream sides of the second return valve and the second target object bypass channel to a downstream side of the tank;
a second tank return valve that controls a return of the fluid from the downstream sides of the second return valve and the second target object bypass channel to the tank;
a second mixing valve that adjusts a mixing ratio of the fluid flowing from the tank into the second chiller to the fluid flowing from the second tank bypass channel into the second chiller; and
a controller that controls the first supply valve, the first return valve, the first on-off valve, the first tank return valve, the first mixing valve, the second supply valve, the second return valve, the second on-off valve, the second tank return valve, and the second mixing valve to control the temperature of the target object.

12. The temperature control system according to claim 11, wherein
the controller switches the temperature control system between a first state and a second state, in the first state, the controller:
controls the first supply valve to allow the supply of the fluid from the first chiller to the target object,
controls the first return valve to allow the return of the fluid from the target object to the tank and the first chiller,
controls the first on-off valve to close the first target object bypass channel,
controls the second supply valve to block the supply of the fluid from the second chiller to the target object,
controls the second return valve to block the return of the fluid from the target object to the tank and the second chiller, and
controls the second on-off valve to open the second target object bypass channel, and in the second state, the controller:
controls the first supply valve to block the supply of the fluid from the first chiller to the target object,
controls the first return valve to block the return of the fluid from the target object to the tank and the first chiller,
controls the first on-off valve to open the first target object bypass channel,
controls the second supply valve to allow the supply of the fluid from the second chiller to the target object,
controls the second return valve to allow the return of the fluid from the target object to the tank and the second chiller, and controls the second on-off valve to close the second target object bypass channel.

13. The temperature control system according to claim 12, wherein in the first state, the controller controls:
the first tank return valve to block the return of the fluid from the downstream sides of the first return valve and the first target object bypass channel to the tank,
the first mixing valve to stop the fluid from flowing from the tank into the first chiller and to allow the fluid to flow from the first tank bypass channel into the first chiller;
the second tank return valve to allow the return of the fluid from the downstream sides of the second return valve and the second target object bypass channel to the tank; and
the second mixing valve to allow the fluid to flow from the tank into the second chiller and allow the fluid to flow from the second tank bypass channel into the second chiller.

14. The temperature control system according to claim 12, wherein
the fluid capacity is defined by adding an amount of the fluid based on a heat capacity of the target object to a fluid capacity of the target object,
once the temperature control system is switched from the first state to the second state, the controller starts to control the second mixing valve to allow the fluid to flow from the tank into the second chiller and to stop the fluid from flowing from the second tank bypass channel into the second chiller, and
once an amount of the fluid that has flowed into the tank since the temperature control system is switched to the second state reaches the fluid capacity, the controller starts to control the second tank return valve to block the return of the fluid to the tank, control the first tank return valve to allow the return of the fluid to the tank, and control the first mixing valve to allow the fluid to flow from the tank into the first chiller in an amount less than an amount of the fluid that flows from the first tank bypass channel into the first chiller.

15. The temperature control system according to claim 12, wherein
the fluid capacity is defined based on a heat capacity of the target object,
once an amount of the fluid that has flowed into the first chiller since the first and second supply valves are controlled reaches a fluid capacity of the target object, the controller switches the temperature control system from the first state to the second state,
once the temperature control system is switched to the second state, the controller starts to control the second mixing valve to allow the fluid to flow from the tank into the second chiller and to stop the fluid from flowing from the second tank bypass channel into the second chiller, and
once an amount of the fluid that has flowed into the tank since the temperature control system is switched to the second state reaches the fluid capacity, the controller starts to control the first tank return valve to allow the return of the fluid to the tank, control the second tank return valve to block the return of the fluid to the tank, and control the first mixing valve to allow the fluid to flow from the tank into the first chiller in an amount less than an amount of the fluid that flows from the first tank bypass channel into the first chiller.

16. The temperature control system according to claim 11, further comprising:
a first heat accumulator that is disposed between the first mixing valve and the first chiller, comprises a first heat storage medium, and stores thermal energy based on a state change of the first heat storage medium at a third temperature when the fluid passes through the first heat accumulator; and a second heat accumulator that is disposed between the second mixing valve and the second chiller, comprises a second heat storage medium, and stores thermal energy based on a state change of the second heat storage medium at a fourth temperature when the fluid passes through the second heat accumulator, wherein the third temperature is lower than the first temperature and higher than a temperature of the fluid that is held in the tank after the temperature control system is switched from a state in which the fluid is supplied to the target object via the second supply valve to a state in which the fluid is supplied to the target object via the first supply valve, and the fourth temperature is higher than the second temperature and lower than a temperature of the fluid that is held in the tank after the temperature control system is switched from a state in which the fluid is supplied to the target object via the first supply valve to a state in which the fluid is supplied to the target object via the second supply valve.

\* \* \* \* \*